US012795465B2

(12) United States Patent
Aggarwal et al.

(10) Patent No.: US 12,795,465 B2
(45) Date of Patent: Nov. 10, 2026

(54) FAST RLF RECOVERY IN NTN

(71) Applicant: QUALCOMM Incorporated, San Diego, CA (US)

(72) Inventors: Rajat Aggarwal, Hyderabad (IN); Sapan Bhartiya, Hyderabad (IN); Amar Kumar Nandan, Hyderabad (IN); Nikhil Rajpal, Gurugram (IN)

(73) Assignee: QUALCOMM Incorporated, San Diego, CA (US)

( * ) Notice: Subject to any disclaimer, the term of this patent is extended or adjusted under 35 U.S.C. 154(b) by 224 days.

(21) Appl. No.: 18/506,044

(22) Filed: Nov. 9, 2023

(65) Prior Publication Data

US 2025/0159559 A1 May 15, 2025

(51) Int. Cl.
*H04W 4/00* (2018.01)
*H04W 36/00* (2009.01)

(52) U.S. Cl.
CPC ... *H04W 36/0055* (2013.01); *H04W 36/0033* (2013.01)

(58) Field of Classification Search
CPC ......... H04W 36/0055; H04W 36/0033; H04W 76/19; H04W 36/08
See application file for complete search history.

(56) References Cited

U.S. PATENT DOCUMENTS 12,075,292 B2 * 8/2024 Liu .................. H04W 36/0058
12,250,605 B2 * 3/2025 Je ............................ G06N 3/02
2010/0238799 A1 * 9/2010 Sebire .................... H04W 4/24 370/225
2013/0150023 A1 * 6/2013 Kim .................... H04W 36/322 455/423
2015/0023319 A1 * 1/2015 Park .................. H04W 36/0064 370/331
2015/0327130 A1 * 11/2015 Park .................. H04W 36/0079 455/436
2016/0353511 A1 * 12/2016 Gunnarsson ...... H04W 28/0268
2019/0028936 A1 * 1/2019 Xu .................... H04W 36/0033
2020/0214070 A1 * 7/2020 Ingale ................. H04W 12/106
2021/0211945 A1 * 7/2021 Rugeland .............. H04W 76/16
2021/0345208 A1 * 11/2021 Rugeland .......... H04W 36/0038
2021/0400549 A1 * 12/2021 Awada .............. H04W 36/0016
2022/0046487 A1 * 2/2022 Yiu ....................... H04W 76/19
(Continued)

OTHER PUBLICATIONS

International Search Report and Written Opinion—PCT/US2024/049602—ISA/EPO—Dec. 19, 2024—13 pages.
(Continued)

*Primary Examiner* — Abdelnabi O Musa
(74) *Attorney, Agent, or Firm* — Procopio, Cory, Hargreaves & Savitch LLP/QUALCOMM Incorporated

(57) ABSTRACT

A method for wireless communication at a target network entity and related apparatus are provided. In the method, the target network entity receives a handover request to the target network entity for one or more user equipment (UEs). The handover request indicates a link failure with a source network entity as a cause for the handover request. The target network entity further receives a re-establishment request from one UE of the one or more UEs and communicate with the one UE based on a UE context obtained prior to the re-establishment request.

30 Claims, 13 Drawing Sheets

(56) References Cited

U.S. PATENT DOCUMENTS

| | | | | |
|---|---|---|---|---|
| 2023/0217324 A1* | 7/2023 | Yu | H04W 36/0072 | |
| | | | 370/331 | |
| 2024/0031844 A1* | 1/2024 | Jeong | H04W 36/249 | |
| 2026/0059417 A1* | 2/2026 | Balan | H04W 36/0069 | |

OTHER PUBLICATIONS

Qualcomm Incorporated, et al., "UE Context Fetch for Mobility Enhancements", 3GPP TSG-RAN WG3#83, R3-140285_ CONTEXT Fetch, 3rd Generation Partnership Project (3GPP), Mobile Competence Centre, 650, Route Des Lucioles, F-06921 Sophia-Antipolis Cedex, France, vol. RAN WG3, No. Prague, Czech Republic, Feb. 10, 2014-Feb. 14, 2014, Feb. 1, 2014, 4 Pages, XP050755785, section 2 figure 1.

3GPP TS 38.423: "3rd Generation Partnership Project, Technical Specification Group Radio Access Network, NG-RAN, Xn Application Protocol (XnAP) (Release 17)", 3GPP TS 38.423, V17.6.0, 3GPP, Mobile Competence Centre, 650, Route Des Lucioles, F-06921, Sophia-Antipolis Cedex, France, Sep. 2023, pp. 1-591, Section 9.2.3.2.

Samsung: "New SID: Study on Satellite Access Phase 3", 3GPP TSG-SA WG2#157, Berlin, Germany, May 22-26, 2023, S2-2307384, (revision of xx-yyxxxx), 3 Pages.

* cited by examiner

FAST RLF RECOVERY IN NTN

TECHNICAL FIELD

The present disclosure relates generally to communication systems, and more particularly, to fast link failure recovery in wireless communication.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, an apparatus is provided for wireless communication at a target network entity. The apparatus may include at least one memory and at least one processor coupled to the at least one memory. Based at least in part on information stored in the at least one memory, the at least one processor, individually or in any combination, may be configured to receive a handover request to the target network entity for one or more user equipment (UEs), the handover request indicating a link failure with a source network entity as a cause for the handover request; receive, from one UE of the one or more UEs, a re-establishment request; and communicate with the one UE based on a UE context obtained prior to the re-establishment request.

In an aspect of the disclosure, a method is provided for wireless communication at a target network entity. The method includes receiving a handover request to the target network entity for one or more user equipment (UEs), the handover request indicating a link failure with a source network entity as a cause for the handover request; receiving, from one UE of the one or more UEs, a re-establishment request; and communicating with the one UE based on a UE context obtained prior to the re-establishment request.

In an aspect of the disclosure, an apparatus is provided for wireless communication at a target network entity. The apparatus may include means for receiving a handover request to the target network entity for one or more user equipment (UEs), the handover request indicating a link failure with a source network entity as a cause for the handover request; means for receiving, from one UE of the one or more UEs, a re-establishment request; and means for communicating with the one UE based on a UE context obtained prior to the re-establishment request.

In an aspect of the disclosure, a computer-readable medium is provided for wireless communication at a target network entity. The computer-readable medium (e.g., a non-transitory computer-readable medium) stores computer executable code at a source network entity, the code when executed by at least one processor causes the target network entity to perform the method of any of aspects 17-27.

In an aspect of the disclosure, an apparatus is provided for wireless communication at a source network entity. The apparatus may include at least one memory and at least one processor coupled to the at least one memory. Based at least in part on information stored in the at least one memory, the at least one processor, individually or in any combination, may be configured to detect a link failure for one or more UEs; and provide a handover request for a target network entity for each UE of the one or more UEs, the handover request indicating the link failure as a cause for the handover request. The handover request causes the target network entity to prepare a UE context for the one or more UEs prior to receiving a re-establishment request from the one or more UEs.

In an aspect of the disclosure, a method is provided for wireless communication at a source network entity. The method may include detecting a link failure for one or more UEs; and providing a handover request for a target network entity for each UE of the one or more UEs, the handover request indicating the link failure as a cause for the handover request. The handover request causes the target network entity to prepare a UE context for the one or more UEs prior to receiving a re-establishment request from the one or more UEs.

In an aspect of the disclosure, an apparatus is provided for wireless communication at a source network entity. The apparatus may include means for detecting a link failure for one or more UEs; and means for providing a handover request for a target network entity for each UE of the one or more UEs, the handover request indicating the link failure as a cause for the handover request. The handover request causes the target network entity to prepare a UE context for the one or more UEs prior to receiving a re-establishment request from the one or more UEs.

In an aspect of the disclosure, a computer-readable medium is provided for wireless communication at a source network entity. The computer-readable medium (e.g., a non-transitory computer-readable medium) stores computer executable code at a source network entity, the code when executed by at least one processor causes the source network entity to detect a link failure for one or more UEs; and provide a handover request for a target network entity for each UE of the one or more UEs, the handover request indicating the link failure as a cause for the handover request. The handover request causes the target network entity to prepare a UE context for the one or more UEs prior to receiving a re-establishment request from the one or more UEs.

To the accomplishment of the foregoing and related ends, the one or more aspects may include the features hereinafter fully described and particularly pointed out in the claims. The following description and the drawings set forth in detail certain illustrative features of the one or more aspects. These features are indicative, however, of but a few of the various ways in which the principles of various aspects may be employed.

DETAILED DESCRIPTION

Figure 1:
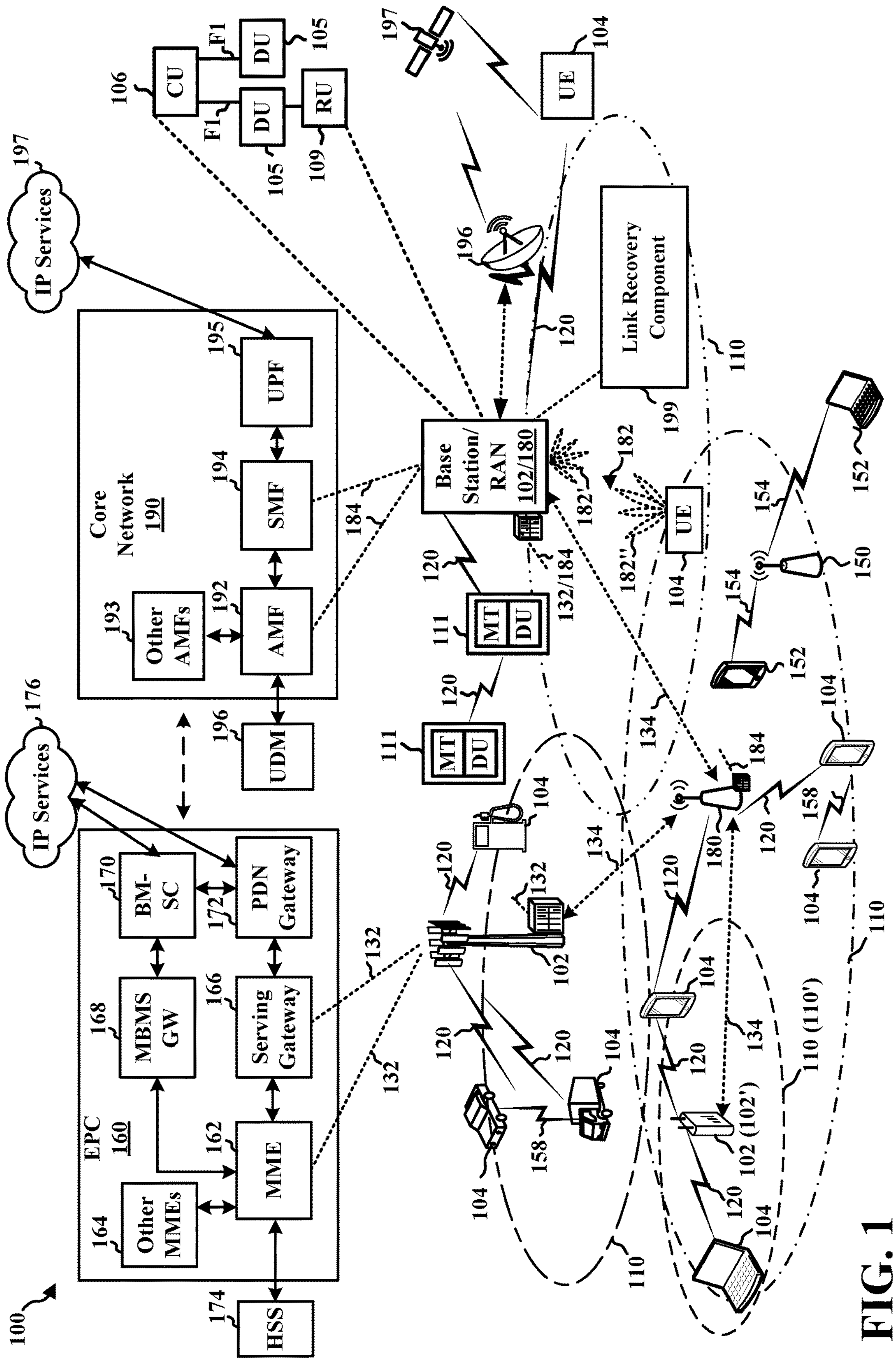
FIG. 1 is a diagram illustrating an example of a wireless communications system and an access network (NW), in accordance with various aspects of the present disclosure.

In wireless communication networks, such as non-terrestrial networks (NTNs), one challenge is the efficient and reliable management of intermittent feeder link availability, which may adversely affect user equipment (UE) connectivity. Methods to re-establish connections between a UE and a network when the feeder link to a satellite serving the UE becomes unavailable can be time-consuming and consume a significant amount of energy. Example aspects presented herein introduce approaches for faster connection recovery following feeder link failures in NTNs. For example, a source network node may send a handover request indicating the cause to be a feeder link failure in response to detecting a feeder link failure, e.g., and prior to a request from a target network node. By providing the handover request and UE information when the feeder link failure is detected, the target network node can prepare the UE context in advance of receiving a reestablishment request from a UE. This enables the target network node to have the UE context ready and reduces the time to reestablishment of a connection between the UE and the target network node. This approach not only facilitates fast reconnection but also ensures efficient power utilization and improves quality of service (QoS). Additionally, although the example is provided for NTN, this approach can similarly be integrated into terrestrial networks when the target network is pre-identified. The handover request may be provided from the source network node to the pre-identified target network node prior to a reestablishment request from the UE, e.g., which reduces the time to reconnection when the UE does request the reestablishment.

Various aspects relate generally to wireless communication. Some aspects more specifically relate to fast link recovery in wireless communication. In some examples, a target network entity may receive a handover request to the target network entity for one or more UEs. The handover request indicates a link failure with a source network entity as a cause for the handover request. The target network entity further receives, from one UE of the one or more UEs, a re-establishment request and communicates with the one UE based on a UE context obtained prior to the re-establishment request. In some aspects, the target network entity may prepare the UE context for each UE of the one or more UEs based on information in the handover request prior to receiving the re-establishment request from any of the one or more UEs. In some aspects, the source network entity may be associated with a non-terrestrial network (NTN), and the link failure is a feeder link failure. In some aspects, the source network entity may be associated with a terrestrial network (TN).

Particular aspects of the subject matter described in this disclosure can be implemented to realize one or more of the following potential advantages. In some examples, by allowing a source network entity to signal a target network entity to prepare the UE context in anticipation of a potential handover when the source network entity detects a link failure with the UE, the target network may prepare the UE context even before it receives fa re-establishment request from the UE. Hence, the described techniques can be used to lower the latency, facilitate the re-establishment of connection, and improve the QoS in wireless communication. In some examples, since the target network is already prepared with the UE context when the UE sends a re-establishment request to the target network, the target network does not need to extract the UE context from the source network, thereby reducing the power consumption and latency to reestablish a connection with the UE.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. When multiple processors are implemented, the multiple processors may perform the functions individually or in combination. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (e.g., an EPC 160), and another core network 190 (e.g., a 5G Core (5GC)). The base stations 102 may include macrocells (high power cellular base station) and/or small cells (low power cellular base station). The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

In some aspects, a base station (e.g., one of the base stations 102 or one of base stations 180) may be referred to as a RAN and may include aggregated or disaggregated components. As an example of a disaggregated RAN, a base station may include a central unit (CU) (e.g., a CU 106), one or more distributed units (DU) (e.g., a DU 105), and/or one or more remote units (RU) (e.g., an RU 109), as illustrated in FIG. 1. A RAN may be disaggregated with a split between the RU 109 and an aggregated CU/DU. A RAN may be disaggregated with a split between the CU 106, the DU 105, and the RU 109. A RAN may be disaggregated with a split between the CU 106 and an aggregated DU/RU. The CU 106 and the one or more DUs may be connected via an F1 interface. A DU 105 and an RU 109 may be connected via a fronthaul interface. A connection between the CU 106 and a DU 105 may be referred to as a midhaul, and a connection between a DU 105 and the RU 109 may be referred to as a fronthaul. The connection between the CU 106 and the core network 190 may be referred to as the backhaul.

The RAN may be based on a functional split between various components of the RAN, e.g., between the CU 106, the DU 105, or the RU 109. The CU 106 may be configured to perform one or more aspects of a wireless communication protocol, e.g., handling one or more layers of a protocol stack, and the one or more DUs may be configured to handle other aspects of the wireless communication protocol, e.g., other layers of the protocol stack. In different implementations, the split between the layers handled by the CU and the layers handled by the DU may occur at different layers of a protocol stack. As one, non-limiting example, a DU 105 may provide a logical node to host a radio link control (RLC) layer, a medium access control (MAC) layer, and at least a portion of a physical (PHY) layer based on the functional split. An RU may provide a logical node configured to host at least a portion of the PHY layer and radio frequency (RF) processing. The CU 106 may host higher layer functions, e.g., above the RLC layer, such as a service data adaptation protocol (SDAP) layer, a packet data convergence protocol (PDCP) layer, and/or an upper layer. In other implementations, the split between the layer functions provided by the CU, the DU, or the RU may be different.

The base stations 102 may wirelessly communicate with the UEs 104. Each of the base stations 102 may provide communication coverage for a respective geographic coverage area 110. There may be overlapping geographic coverage areas. For example, a small cell may have a coverage area 111 that overlaps the respective geographic coverage area 110 of one or more base stations (e.g., one or more macro base stations, such as the base stations 102). A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE to a base station and/or downlink (DL) (also referred to as forward link) transmissions from a base station to a UE. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs may communicate with each other using device-to-device (D2D) communication links, such as a D2D communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth™ (Bluetooth is a trademark of the Bluetooth Special Interest Group (SIG)), Wi-Fi™ (Wi-Fi is a trademark of the Wi-Fi Alliance) based on the Institute of Electrical and Electronics Engineers (IEEE), Wi-Fi based on the IEEE 802.11 standard, LTE, or NR.

The wireless communications system may further include a Wi-Fi access point (AP), such as an AP 150, in communication with Wi-Fi stations (STAs), such as STAs 152, via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell may operate in a licensed and/or unlicensed frequency spectrum. When operating in an unlicensed frequency spectrum, the small cell may employ NR and use the same unlicensed frequency spectrum (e.g., 5 GHz, or the like) as used by the AP 150. The small cell, employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a “sub-6 GHz” band in various documents and articles. A similar nomenclature issue sometimes occurs with regard to FR2, which is often referred to (interchangeably) as a “millimeter wave” band in documents and articles, despite being different from the extremely high frequency (EHF) band (30 GHz-300 GHz) which is identified by the International Telecommunications Union (ITU) as a “millimeter wave” band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

A base station, whether a small cell or a large cell (e.g., a macro base station), may include and/or be referred to as an eNB, gNodeB (gNB), or another type of base station. Some base stations, such as a gNB, may operate in a traditional sub 6 GHz spectrum, in millimeter wave frequencies, and/or near millimeter wave frequencies in communication with the UEs 104. When the gNB operates in millimeter wave or near millimeter wave frequencies, the base stations 180 may be referred to as a millimeter wave base station. A millimeter wave base station may utilize beamforming 182 with the UEs 104 to compensate for the path loss and short range. The base stations 180 and the UEs 104 may each include a plurality of antennas, such as antenna elements, antenna panels, and/or antenna arrays to facilitate the beamforming.

The base stations 180 may transmit a beamformed signal to the UEs 104 in one or more transmit directions 182'. The UEs 104 may receive the beamformed signal from the base stations 180 in one or more receive directions 182". The UEs 104 may also transmit a beamformed signal to the base stations 180 in one or more transmit directions. The base stations 180 may receive the beamformed signal from the UEs 104 in one or more receive directions. The base stations 180/UEs 104 may perform beam training to determine the best receive and transmit directions for each of the base stations 180/UEs 104. The transmit and receive directions for the base stations 180 may or may not be the same. The transmit and receive directions for the UEs 104 may or may not be the same.

The EPC 160 may include a Mobility Management Entity (e.g., an MME 162), other MMEs 164, a Serving Gateway 166, a Multimedia Broadcast Multicast Service (MBMS) Gateway (e.g., a MBMS Gateway 168), a Broadcast Multicast Service Center (BM-SC) (e.g., a BM-SC 170), and a Packet Data Network (PDN) Gateway (e.g., a PDN Gateway 172). The MME 162 may be in communication with a Home Subscriber Server (HSS) (e.g., an HSS 174). The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) (e.g., an AMF 192), other AMFs 193, a Session Management Function (SMF) 194, and a User Plane Function (UPF) (e.g., a UPF 195). The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base stations 102 may include and/or be referred to as a gNB, Node B, eNB, an access point, a base transceiver station, a radio base station, a radio transceiver, a transceiver function, a basic service set (BSS), an extended service set (ESS), a transmission reception point (TRP), network node, network entity, network equipment, or some other suitable terminology. The base stations 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN). The base stations 102 provide an access point to the EPC 160 or core network 190 for the UEs 104.

Examples of UEs include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs may be referred to as IoT devices (e.g., parking meter, gas pump, toaster, vehicles, heart monitor, etc.). The UEs may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in some aspects, the base station 102 may have a link recovery component 199. In some aspects, the link recovery component 199 may be configured to receive a handover request to the target network entity for one or more user equipment (UEs), the handover request indicating a link failure with a source network entity as a cause for the handover request; receive, from one UE of the one or more UEs, a re-establishment request; and communicate with the one UE based on a UE context obtained prior to the re-establishment request. In some aspects, the link recovery component 199 may be configured to detect a link failure for one or more UEs; and provide a handover request for a target network entity for each UE of the one or more UEs, the handover request indicating the link failure as a cause for the handover request, wherein the handover request causes the target network entity to prepare a UE context for the one or more UEs prior to receiving a re-establishment request from the one or more UEs.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 2:
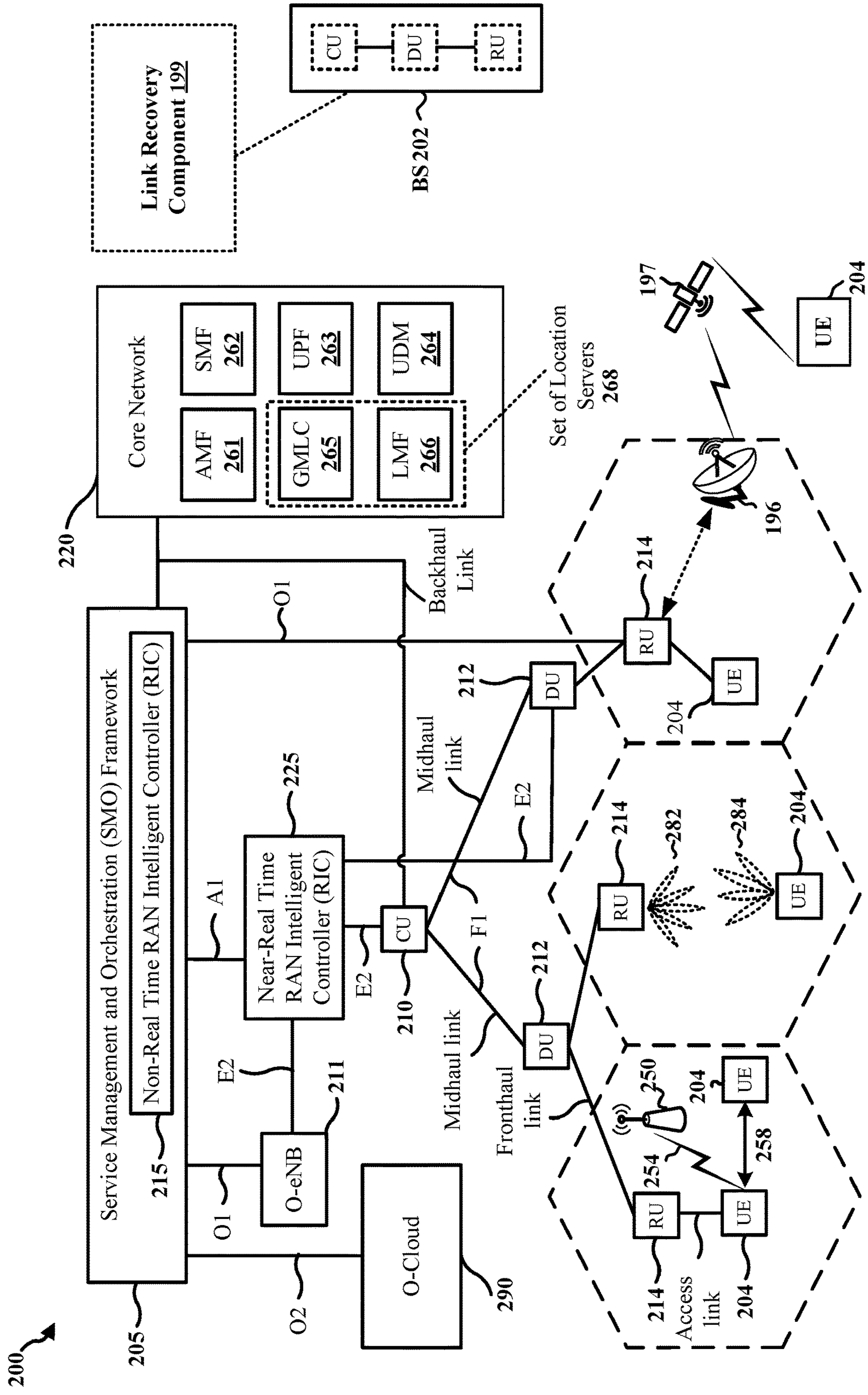
FIG. 2 shows a diagram illustrating architecture of an example of a disaggregated base station, in accordance with various aspects of the present disclosure.

As an example, FIG. 2 shows a diagram illustrating architecture of an example of a disaggregated base station 200. The architecture of the disaggregated base station 200 may include one or more CUs (e.g., a CU 210) that can communicate directly with a core network 220 via a backhaul link, or indirectly with the core network 220 through one or more disaggregated base station units (such as a Near-Real Time (Near-RT) RAN Intelligent Controller (RIC) (e.g., a Near-RT RIC 225) via an E2 link, or a Non-Real Time (Non-RT) RIC (e.g., a Non-RT RIC 215) associated with a Service Management and Orchestration (SMO) Framework (e.g., an SMO Framework 205), or both). A CU 210 may communicate with one or more DUs (e.g., a DU 212) via respective midhaul links, such as an F1 interface. The DU 212 may communicate with one or more RUs (e.g., an RU 214) via respective fronthaul links. The RU 214 may communicate with respective UEs (e.g., a UE 204) via one or more radio frequency (RF) access links. In some implementations, the UE 204 may be simultaneously served by multiple RUs.

Each of the units, i.e., the CUs (e.g., a CU 210), the DUs (e.g., a DU 212), the RUs (e.g., an RU 214), as well as the Near-RT RICs (e.g., the Near-RT RIC 225), the Non-RT RICs (e.g., the Non-RT RIC 215), and the SMO Framework 205, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (i.e., Central Unit-User Plane (CU-UP)), control plane functionality (i.e., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as an E1 interface when implemented in an O-RAN configuration. The CU 210 can be implemented to communicate with the DU 212, as necessary, for network control and signaling.

The DU 212 may correspond to a logical unit that includes one or more base station functions to control the operation of one or more RUs. In some aspects, the DU 212 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 212 may further host one or more low PHY layers. Each layer (or module) can be implemented with an interface configured to communicate signals with other layers (and modules) hosted by the DU 212, or with the control functions hosted by the CU 210.

Lower-layer functionality can be implemented by one or more RUs. In some deployments, an RU 214, controlled by a DU 212, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU 214 can be implemented to handle over the air (OTA) communication with one or more UEs (e.g., the UE 204). In some implementations, real-time and non-real-time aspects of control and user plane communication with the RU 214 can be controlled by a corresponding DU. In some scenarios, this configuration can enable the DU(s) and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements that may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs, DUs, RUs and Near-RT RICs. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs, one or more DUs, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via 01) or via creation of RAN management policies (such as A1 policies).

At least one of the CU 210, the DU 212, and the RU 214 may be referred to as a base station 202. Accordingly, a base station 202 may include one or more of the CU 210, the DU 212, and the RU 214 (each component indicated with dotted lines to signify that each component may or may not be included in the base station 202). The base station 202 provides an access point to the core network 220 for a UE 204. The communication links between the RUs (e.g., the RU 214) and the UEs (e.g., the UE 204) may include uplink (UL) (also referred to as reverse link) transmissions from a UE 204 to an RU 214 and/or downlink (DL) (also referred to as forward link) transmissions from an RU 214 to a UE 204.

Certain UEs may communicate with each other using D2D communication (e.g., a D2D communication link 258). The D2D communication link 258 may use the DL/UL WWAN spectrum. The D2D communication link 258 may use one or more sidelink channels. D2D communication may be through a variety of wireless D2D communications systems, such as for example, Bluetooth, Wi-Fi based on the IEEE 802.11 standard, LTE, or NR.

The wireless communications system may further include a Wi-Fi AP 250 in communication with a UE 204 (also referred to as Wi-Fi STAs) via communication link 254, e.g., in a 5 GHz unlicensed frequency spectrum or the like. When communicating in an unlicensed frequency spectrum, the UE 204/Wi-Fi AP 250 may perform a CCA prior to communicating in order to determine whether the channel is available.

The base station 202 and the UE 204 may each include a plurality of antennas, such as antenna elements, antenna panels, and/or antenna arrays to facilitate beamforming. The base station 202 may transmit a beamformed signal 282 to the UE 204 in one or more transmit directions. The UE 204 may receive the beamformed signal from the base station 202 in one or more receive directions. The UE 204 may also transmit a beamformed signal 284 to the base station 202 in one or more transmit directions. The base station 202 may receive the beamformed signal from the UE 204 in one or more receive directions. The base station 202/UE 204 may perform beam training to determine the best receive and transmit directions for each of the base station 202/UE 204. The transmit and receive directions for the base station 202 may or may not be the same. The transmit and receive directions for the UE 204 may or may not be the same.

The core network 220 may include an Access and Mobility Management Function (AMF) (e.g., an AMF 261), a Session Management Function (SMF) (e.g., an SMF 262), a User Plane Function (UPF) (e.g., a UPF 263), a Unified Data Management (UDM) (e.g., a UDM 264), one or more location servers 268, and other functional entities. The AMF 261 is the control node that processes the signaling between the UEs and the core network 220. The AMF 261 supports registration management, connection management, mobility management, and other functions. The SMF 262 supports session management and other functions. The UPF 263 supports packet routing, packet forwarding, and other functions. The UDM 264 supports the generation of authentication and key agreement (AKA) credentials, user identification handling, access authorization, and subscription management. The one or more location servers 268 are illustrated as including a Gateway Mobile Location Center (GMLC) (e.g., a GMLC 265) and a Location Management Function (LMF) (e.g., an LMF 266). However, generally, the one or more location servers 268 may include one or more location/positioning servers, which may include one or more of the GMLC 265, the LMF 266, a position determination entity (PDE), a serving mobile location center (SMLC), a mobile positioning center (MPC), or the like. The GMLC 265 and the LMF 266 support UE location services. The GMLC 265 provides an interface for clients/applications (e.g., emergency services) for accessing UE positioning information. The LMF 266 receives measurements and assistance information from the NG-RAN and the UE 204 via the AMF 261 to compute the position of the UE 204. The NG-RAN may utilize one or more positioning methods in order to determine the position of the UE 204. Positioning the UE 204 may involve signal measurements, a position estimate, and an optional velocity computation based on the measurements. The signal measurements may be made by the UE 204 and/or the base station 202 serving the UE 204. The signals measured may be based on one or more of a satellite positioning system (SPS) (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Referring again to FIG. 2, in some aspects, the base station 202 may have a link recovery component 199. In some aspects, the link recovery component 199 may be configured to receive a handover request to the target network entity for one or more UEs, the handover request indicating a link failure with a source network entity as a cause for the handover request; receive, from one UE of the one or more UEs, a re-establishment request; and communicate with the one UE based on a UE context obtained prior to the re-establishment request. In some aspects, the link recovery component 199 may be configured to detect a link failure for one or more UEs; and provide a handover request for a target network entity for each UE of the one or more UEs, the handover request indicating the link failure as a cause for the handover request, wherein the handover request causes the target network entity to prepare a UE context for the one or more UEs prior to receiving a re-establishment request from the one or more UEs.

Figure 3A:
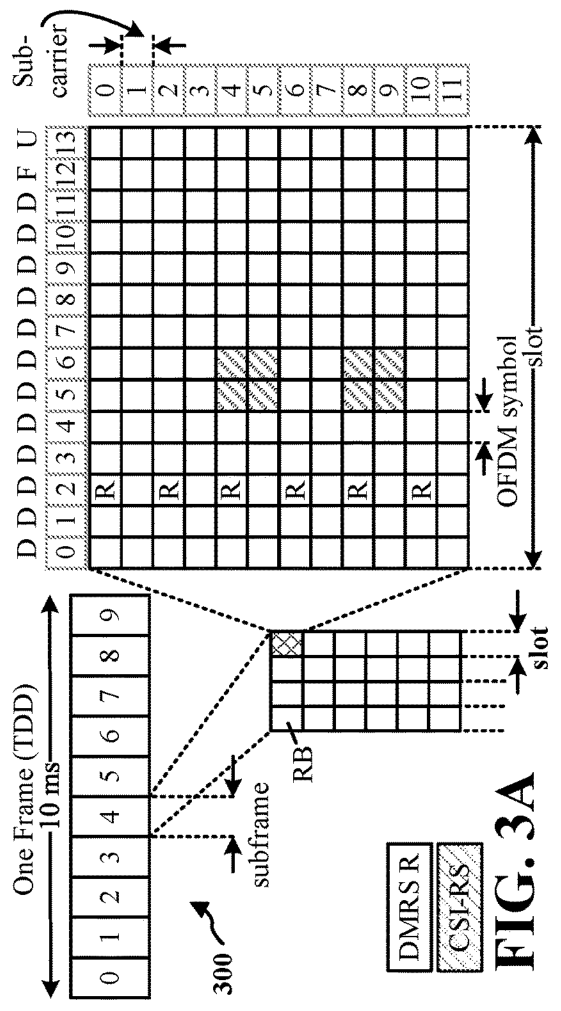
FIG. 3A is a diagram illustrating an example of a first subframe within a 5G NR frame structure, in accordance with various aspects of the present disclosure.
Figure 3B:
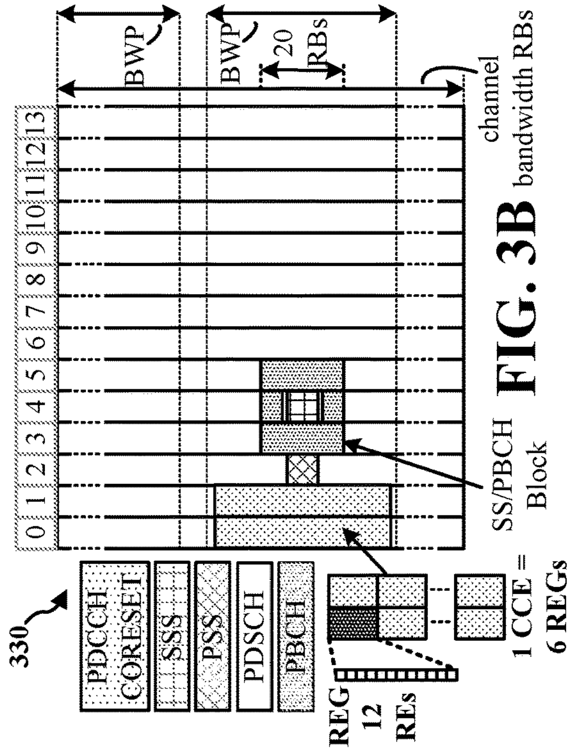
FIG. 3B is a diagram illustrating an example of downlink (DL) channels within a 5G NR subframe, in accordance with various aspects of the present disclosure.
Figure 3C:
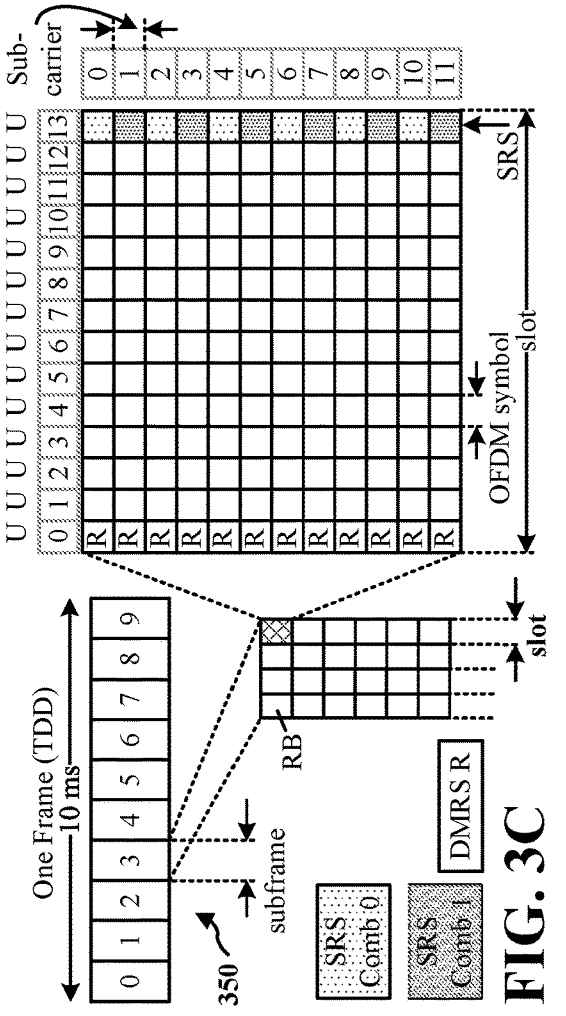
FIG. 3C is a diagram illustrating an example of a second subframe within a 5G NR frame structure, in accordance with various aspects of the present disclosure.
Figure 3D:
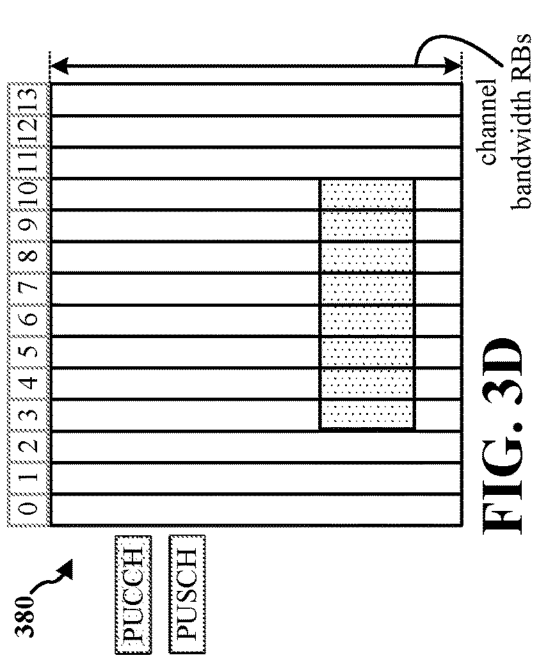
FIG. 3D is a diagram illustrating an example of uplink (UL) channels within a 5G NR subframe, in accordance with various aspects of the present disclosure.

FIG. 3A is a diagram 300 illustrating an example of a first subframe within a 5G NR frame structure. FIG. 3B is a diagram 330 illustrating an example of DL channels within a 5G NR subframe. FIG. 3C is a diagram 350 illustrating an example of a second subframe within a 5G NR frame structure. FIG. 3D is a diagram 380 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 3A, 3C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 3A-3D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| $\mu$ | SCS $\Delta f = 2^{\mu} \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and 2 slots/subframe. As shown in Table 1, the subcarrier spacing may be equal to $2^{\mu}*15$ kHz, where $\mu$ is the numerology 0 to 4. As such, the numerology $\mu$=0 has a subcarrier spacing of 15 kHz and the numerology $\mu$=4 has a subcarrier spacing of 240 kHz. The symbol length/duration is inversely related to the subcarrier spacing. FIGS. 3A-3D provide an example of normal CP with 14 symbols per slot and numerology $\mu$=2 with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 3B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE, such as one of the UEs 104 of FIG. 1 and/or the UE 204 of FIG. 2, to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 4:
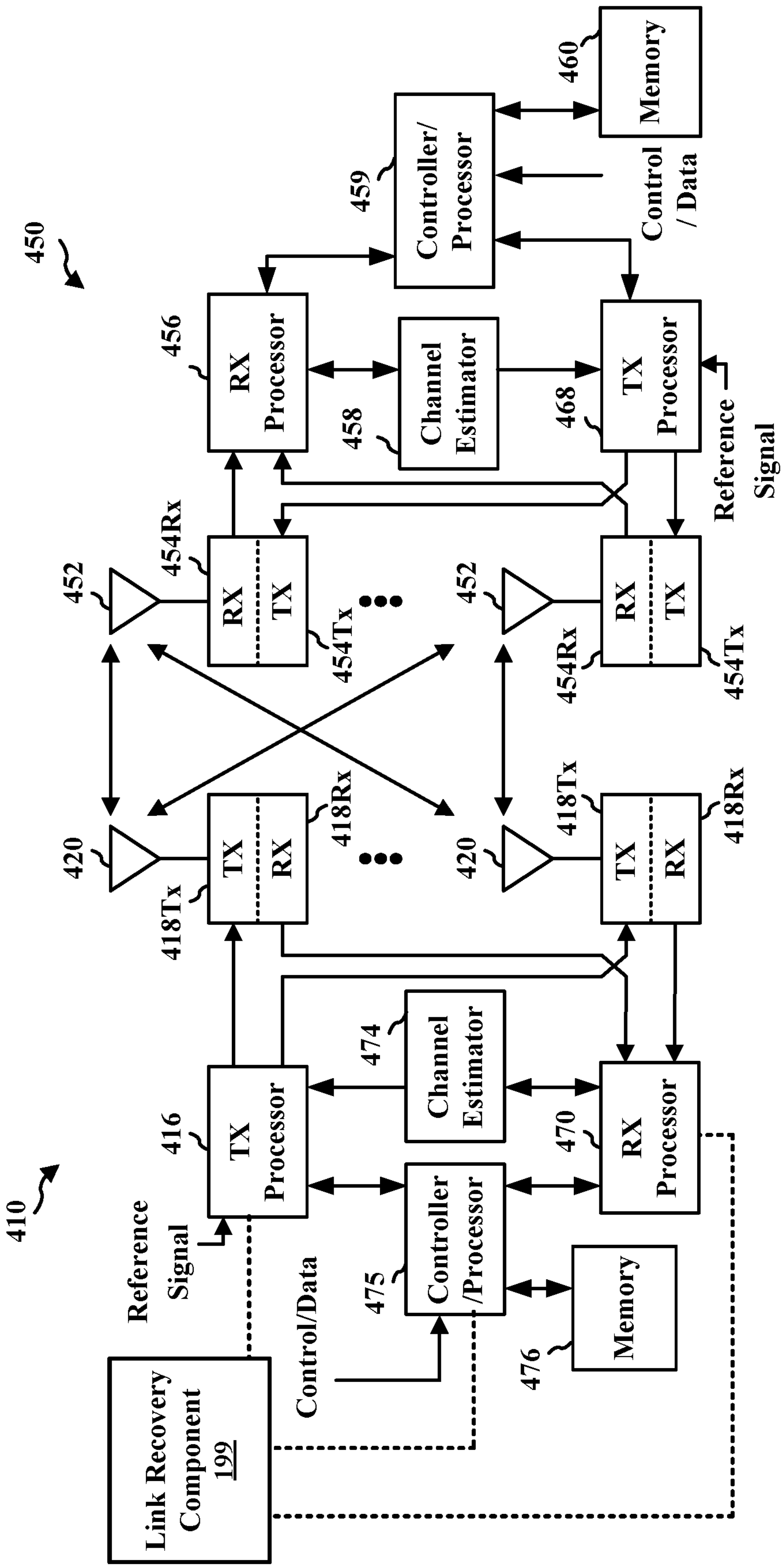
FIG. 4 is a block diagram illustrating an example of a base station in communication with a user equipment (UE) in an access network, in accordance with various aspects of the present disclosure.

FIG. 4 is a block diagram that illustrates an example of a first wireless device that is configured to exchange wireless communication with a second wireless device. In the illustrated example of FIG. 4, the first wireless device may include a base station 410, the second wireless device may include a UE 450, and the base station 410 may be in communication with the UE 450 in an access network. As shown in FIG. 4, the base station 410 includes a transmit processor (TX processor 416), a transmitter 418Tx, a receiver 418Rx, antennas 420, a receive processor (RX processor 470), a channel estimator 474, a controller/processor 475, and at least one memory 476 (e.g., one or more memories). The example UE 450 includes antennas 452, a transmitter 454Tx, a receiver 454Rx, an RX processor 456, a channel estimator 458, a controller/processor 459, at least one memory 460 (e.g., one or more memories), and a TX processor 468. In other examples, the base station 410 and/or the UE 450 may include additional or alternative components.

In the DL, Internet protocol (IP) packets may be provided to the controller/processor 475. The controller/processor 475 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 475 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The TX processor 416 and the RX processor 470 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 416 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from the channel estimator 474 may be used to determine the coding and modulation scheme, as well as for spatial processing. The channel estimate may be derived from a reference signal and/or channel condition feedback transmitted by the UE 450. Each spatial stream may then be provided to a different antenna of the antennas 420 via a separate transmitter (e.g., the transmitter 418Tx). Each transmitter 418Tx may modulate a radio frequency (RF) carrier with a respective spatial stream for transmission.

At the UE 450, each receiver 454Rx receives a signal through its respective antenna of the antennas 452. Each receiver 454Rx recovers information modulated onto an RF carrier and provides the information to the RX processor 456. The TX processor 468 and the RX processor 456 implement layer 1 functionality associated with various signal processing functions. The RX processor 456 may perform spatial processing on the information to recover any spatial streams destined for the UE 450. If multiple spatial streams are destined for the UE 450, two or more of the multiple spatial streams may be combined by the RX processor 456 into a single OFDM symbol stream. The RX processor 456 then converts the OFDM symbol stream from the time domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 410. These soft decisions may be based on channel estimates computed by the channel estimator 458. The soft decisions are then decoded and deinterleaved to recover the data and control signals that were originally transmitted by the base station 410 on the physical channel. The data and control signals are then provided to the controller/processor 459, which implements layer 3 and layer 2 functionality.

The controller/processor 459 can be associated with the at least one memory 460 that stores program codes and data. The at least one memory 460 may be referred to as a computer-readable medium. In the UL, the controller/processor 459 provides demultiplexing between transport and logical channels, packet reassembly, deciphering, header decompression, and control signal processing to recover IP packets. The controller/processor 459 is also responsible for error detection using an ACK and/or NACK protocol to support HARQ operations.

Similar to the functionality described in connection with the DL transmission by the base station 410, the controller/processor 459 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by the channel estimator 458 from a reference signal or feedback transmitted by the base station 410 may be used by the TX processor 468 to select the appropriate coding and modulation schemes, and to facilitate spatial processing. The spatial streams generated by the TX processor 468 may be provided to different antenna of the antennas 452 via separate transmitters (e.g., the transmitter 454Tx). Each transmitter 454Tx may modulate an RF carrier with a respective spatial stream for transmission.

The UL transmission is processed at the base station 410 in a manner similar to that described in connection with the receiver function at the UE 450. Each receiver 418Rx receives a signal through its respective antenna of the antennas 420. Each receiver 418Rx recovers information modulated onto an RF carrier and provides the information to the RX processor 470.

The controller/processor 475 can be associated with the at least one memory 476 that stores program codes and data. The at least one memory 476 may be referred to as a computer-readable medium. In the UL, the controller/processor 475 provides demultiplexing between transport and logical channels, packet reassembly, deciphering, header decompression, control signal processing to recover IP packets. The controller/processor 475 is also responsible for error detection using an ACK and/or NACK protocol to support HARQ operations.

At least one of the TX processor 416, the RX processor 470, and the controller/processor 475 may be configured to perform aspects in connection with the link recovery component 199 of FIG. 1 or FIG. 2.

A non-terrestrial network (NTN) may refer to a wireless communication system that utilizes satellites in order to provide wireless communication services to UEs. In an example, a UE may transmit first data and/or first signal(s) to a satellite via a service link and the satellite may relay the first data and/or the first signal(s) to a network node (e.g., a base station) via a feeder link. In another example, the network node may transmit second data and/or second signal(s) to the satellite via the feeder link and the satellite may relay the second data and/or the second signal(s) to the UE via the service link.

Figures 5A, 5B, 5C:
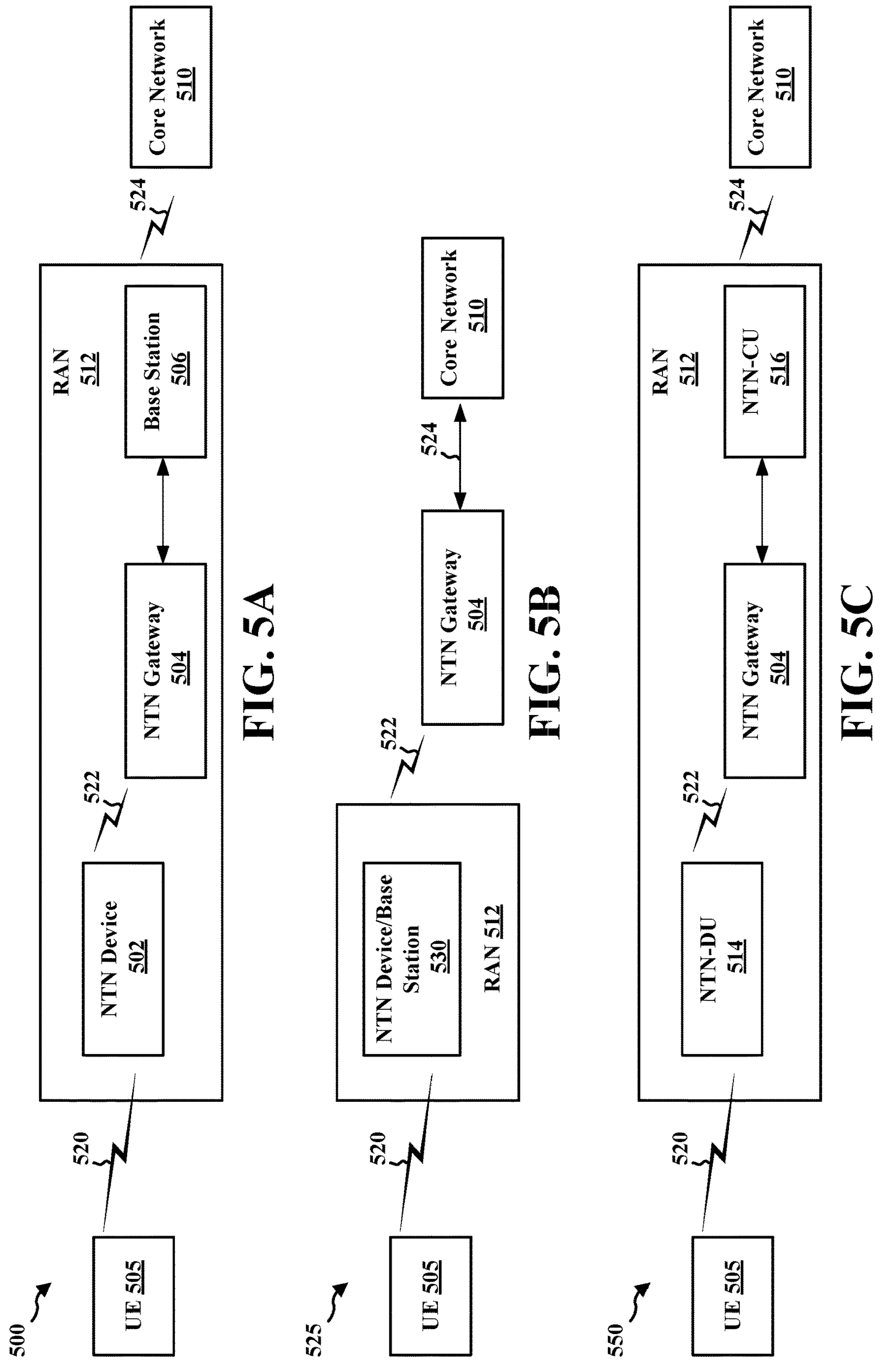
FIG. 5A, FIG. 5B, and FIG. 5C are diagrams illustrating example network architectures capable of supporting NTN access.

FIGS. 5A, 5B, and 5C illustrate example aspects of various network architecture examples capable of supporting NTN access. FIG. 5A illustrates a network architecture with transparent payloads. The network architecture 500 of FIG. 5A includes a UE 505, an NTN device 502 (which may also be referred to as a satellite, an NTN device, or a space vehicle, among other examples), an NTN gateway 504 (sometimes referred to as "gateway," "earth station," or "ground station"), and a base station 506 (which may also be referred to as a network node or network entity) having the capability to communicate with the UE 505 via the NTN device 502. The base station 506 may be a network node or network entity of a terrestrial communication network, for example. A network node may include a base station in aggregation or may correspond to one or more disaggregated components of a base station, such as a CU, DU, and/or RU. The NTN device 502, the NTN gateway 504, and the base station 506 may be part of a RAN 512. As one example, the NTN device 502, the base station 506, and the NTN gateway 504 may be part of an NG RAN, or a RAN for other communication technologies, such as 3G, 4G LTE, 6G, etc. The network architecture 500 is illustrated as further including a core network 510, which may correspond to the core network (e.g., 160, 190, 220) described in connection with FIG. 1 and FIG. 2. A core network 510 may be a public land mobile network (PLMN), for example. Connections in the network architecture 500 with transparent payloads illustrated in FIG. 5A, allow the base station 506 to access the NTN gateway 504 and the core network 510. In some examples, the base station 506 may be shared by multiple PLMNs. Similarly, the NTN gateway 504 may be shared by more than one base station. Although the examples of FIG.

5A, FIG. 5B, and FIG. 5C illustrate one UE 505, many UEs may utilize the network architecture 500. Similarly, the network architecture 500 may include a larger (or smaller) number of NTN devices, NTN gateways, base stations, RAN, core networks, and/or other components. The illustrated connections that connect the various components in the network architecture 500 include data and signaling connections which may include additional (intermediary) components, direct or indirect physical and/or wireless connections, and/or additional networks. Furthermore, components may be rearranged, combined, separated, substituted, and/or omitted, depending on desired functionality.

The UE 505 may be configured to communicate with the core network 510 via the NTN device 502, the NTN gateway 504, and the base station 506. As illustrated by the RAN 512, one or more RANs associated with the core network 510 may include one or more base stations. Access to the network may be provided to the UE 505 via wireless communication between the UE 505 and the base station 506 (e.g., a serving base station), via the NTN device 502 and the NTN gateway 504.

The base station 506 may be referred to by other names such as a network node, a network entity, a gNB, a "satellite node", a satellite NodeB (sNB), "satellite access node", etc. The base station 506 in FIG. 5A may be different than a terrestrial network base station, in some aspects, such as supporting additional capability beyond that of a terrestrial base station. For example, the base station 506 may terminate the radio interface and associated radio interface protocols to the UE 505 and may transmit DL signals to the UE 505 and receive UL signals from the UE 505 via the NTN device 502 and the NTN gateway 504. The base station 506 may also support signaling connections and voice and data bearers to the UE 505 and may support handover of the UE 505 between different radio cells for the NTN device 502, between different NTN devices and/or between different base stations. The base station 506 may be configured to manage moving radio beams (e.g., for airborne vehicles and/or non-geostationary (non-GEO) devices) and associated mobility of the UE 505. The base station 506 may assist in the handover (or transfer) of the NTN device 502 between different NTN gateways or different base stations. Additionally, a coverage area of the base station 506 may be much larger than the coverage area of a terrestrial network base station. In some examples, the base station 506 may be separate from the NTN gateway 504, e.g., as illustrated in the example of FIG. 5A. In other examples, the base station 506 may include or may be combined with one or more NTN gateways, e.g., using a split architecture. For example, with a split architecture, the base station 506 may include a CU, such as the example CU 210 of FIG. 2, and the NTN gateway 504 may include or act as DU, such as the example DU 212 of FIG. 2. The base station 506 may be fixed on the ground for transparent payload operation. In one implementation, the base station 506 may be physically combined with, or physically connected to, the NTN gateway 504 to reduce complexity and cost.

The NTN gateway 504 may be shared by more than one base station and may communicate with the UE 505 via the NTN device 502. The NTN gateway 504 may be dedicated to one associated constellation of NTN devices. The NTN gateway 504 may be included within the base station 506, e.g., as a base station-DU within the base station 506.

In the illustrated example of FIG. 5A, a service link 520 may facilitate communication between the UE 505 and the NTN device 502, a feeder link 522 may facilitate communication between the NTN device 502 and the NTN gateway 504, and an interface 524 may facilitate communication between the base station 506 and the core network 510. The service link 520 and the feeder link 522 may be implemented by a same radio interface (e.g., a Uu interface).

FIG. 5B shows a diagram of a network architecture 525 capable of supporting NTN access similar to FIG. 5A, but having a network architecture for regenerative payloads, as opposed to transparent payloads shown in FIG. 5A. A regenerative payload, unlike a transparent payload, includes an on-board base station (e.g., includes the functional capability of a base station), and is referred to herein as an NTN device/base station 530. The on-board base station may be a network node that corresponds to the network device (e.g., 102 or 410 FIG. 1 or FIG. 4). The RAN 512 is illustrated as including the NTN device/base station 530 for communication with the UE 505 and the core network 510.

An on-board base station may perform many of the same functions as the base station 506, as described previously. For example, the NTN device/base station 530 may terminate the radio interface and associated radio interface protocols to the UE 505 and may transmit DL signals to the UE 505 and receive UL signals from the UE 505, which may include encoding and modulation of transmitted signals and demodulation and decoding of received signals. The NTN device/base station 530 may communicate with one or more NTN gateways and with one or more core networks via the NTN gateway 504. In some aspects, the NTN device/base station 530 may communicate directly with other NTN device/base stations using Inter-Satellite Links (ISLs), which may support an Xn interface between any pair of NTN device/base stations.

With low Earth orbit (LEO) devices, the NTN device/base station 530 may manage moving radio cells with coverage at different times. The NTN gateway 504 may be connected directly to the core network 510, as illustrated. The NTN gateway 504 may be shared by multiple core networks, for example, if NTN gateways are limited. In some examples the core network 510 may be aware of coverage area(s) of the NTN device/base station 530 in order to page the UE 505 and to manage handover.

FIG. 5C shows a diagram of a network architecture 550 similar to that shown in FIGS. 5A and 5B, that supports regenerative payloads, as opposed to transparent payloads, as shown in FIG. 5A, and with a split architecture for the base station. For example, the base station may be split between a CU (e.g., such as CU 210 of FIG. 2), and a DU (e.g., such as the DU 212 of FIG. 2). In the illustrated example of FIG. 5C, the network architecture 550 includes an NTN-CU 516, which may be a component of a ground-based base station or a terrestrial base station. The regenerative payloads include an on-board base station DU, and is referred to herein as an NTN-DU 514. The NTN-CU 516 and the NTN-DU 514, collectively or individually, may correspond to the network node associated with the network device (e.g., base station 410) in FIG. 4.

The NTN-DU 514 communicates with the NTN-CU 516 via the NTN gateway 504. The NTN-CU 516 together with the NTN-DU 514 perform functions, and may use internal communication protocols, e.g., based on a split architecture. The NTN-CU 516 and the NTN-DU 514 may each support additional capabilities to provide the UE 505 access using NTN devices.

The NTN-DU 514 and the NTN-CU 516 may communicate with one another using an F1 Application Protocol (F1AP), and together may perform some or all of the same functions as the base station 506 or the NTN device/base station 530 as described in connection with FIGS. 5A and 5B, respectively.

The NTN-DU 514 may terminate the radio interface and associated lower level radio interface protocols to the UE 505 and may transmit DL signals to the UE 505 and receive UL signals from the UE 505, which may include encoding and modulation of transmitted signals and demodulation and decoding of received signals. The operation of the NTN-DU 514 may be partly controlled by the NTN-CU 516. The NTN-DU 514 may support one or more radio cells for the UE 505. The NTN-CU 516 may also be split into separate control plane (CP) (NTN-CU-CP) and user plane (UP) (NTN-CU-UP) portions. The NTN-DU 514 and the NTN-CU 516 may communicate over an F1 interface to (a) support control plane signaling for the UE 505 using IP, Stream Control Transmission Protocol (SCTP) and F1 Application Protocol (F1AP) protocols, and (b) to support user plane data transfer for a UE 505 using IP, User Datagram Protocol (UDP), PDCP, SDAP, GTP-U and NR User Plane Protocol (NRUPP) protocols.

The NTN-CU 516 may communicate with one or more other NTN-CUs and/or with one more other terrestrial base stations using terrestrial links to support an Xn interface between any pair of NTN-CUs and/or between the NTN-CU 516 and a terrestrial base station.

Figure 6:
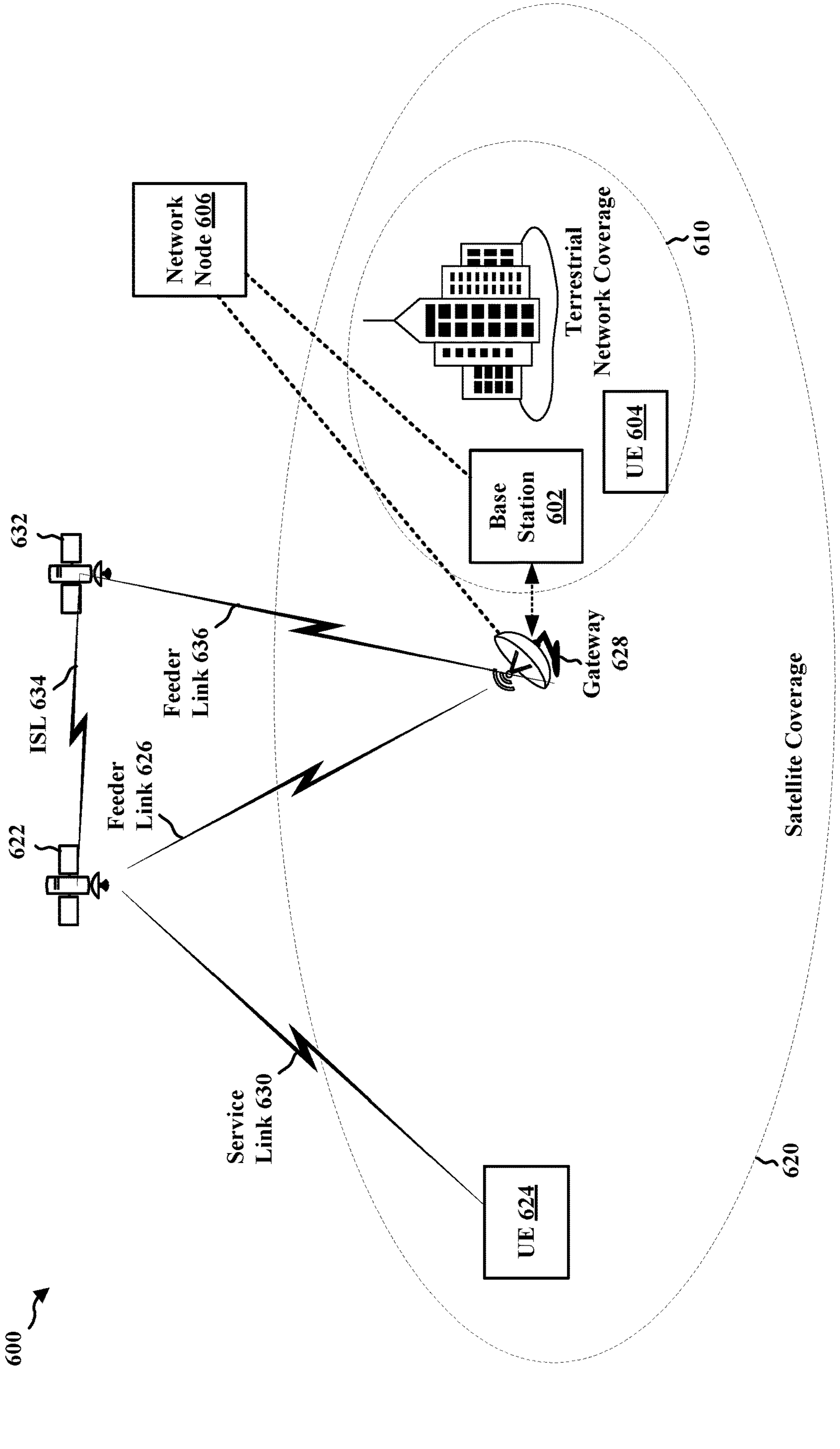
FIG. 6 is a diagram illustrating an example of a 5G NR non-terrestrial network (NTN).

In some examples, a UE may communicate with a terrestrial network. FIG. 6 is a diagram illustrating an example environment 600 that may support wireless communication including aspects of a terrestrial network and a non-terrestrial network, as presented herein. In the illustrated example of FIG. 6, a terrestrial network includes a base station 602 that provides coverage to UEs, such as an example UE 604, located within a coverage area 610 for the terrestrial network. The base station 602 may facilitate communication between the UE 604 and a network node 606. Aspects of the network node 606 may be implemented by a core network, such as the example core network 220 of FIG. 2.

In some examples, a UE may transmit or receive satellite-based communication (e.g., via an Iridium-like satellite communication system or a satellite-based 3GPP NTN). For example, an NTN device 622 (which may also be referred to as a space vehicle (SV) a non-terrestrial device, a satellite, etc.) may provide coverage to UEs, such as an example UE 624, located within a coverage area 620 for the NTN device 622. In some examples, the NTN device 622 may communicate with the network node 606 through a feeder link 626 established between the NTN device 622 and a gateway 628 in order to provide service to the UE 624 within the coverage area 620 of the NTN device 622 via a service link 630. The feeder link 626 may include a wireless link between the NTN device 622 and the gateway 628. The service link 630 may include a wireless link between the NTN device 622 and the UE 624. In some examples, the gateway 628 may communicate directly with the network node 606. In some examples, the gateway 628 may communicate with the network node 606 via the base station 602.

In some aspects, the NTN device 622 may be configured to communicate directly with the gateway 628 via the feeder link 626. The feeder link 626 may include a radio link that provides wireless communication between the NTN device 622 and the gateway 628.

In other aspects, the NTN device 622 may communicate with the gateway 628 via one or more other NTN devices. For example, the NTN device 622 and a second NTN device 632 may be part of a constellation of satellites (e.g., NTN devices) that communicate via inter-satellite links (ISLs). In the example of FIG. 6, the NTN device 622 may establish an ISL 634 with the second NTN device 632. The ISL 634 may be a radio interface or an optical interface and operate in the RF frequency or optical bands, respectively. The second NTN device 632 may communicate with the gateway 628 via a second feeder link 636.

In some examples, the NTN device 622 and/or the second NTN device 632 may include an non-terrestrial device, such as an aircraft system, a balloon, etc. Examples of a platform that may be used for NTN communication include systems including Tethered UAS (TUA), Lighter Than Air UAS (LTA), Heavier Than Air UAS (HTA), and High Altitude Platforms (HAPs). In some examples, the NTN device 622 and/or the second NTN device 632 may include a satellite or a space-borne vehicle placed into Low-Earth Orbit (LEO), Medium-Earth Orbit (MEO), Geostationary Earth Orbit (GEO), or High Elliptical Orbit (HEO).

In some aspects, the NTN device 622 and/or the second NTN device 632 may implement a transparent payload. For example, after receiving a signal, a transparent NTN device may have the ability to change the frequency carrier of the signal, perform RF filtering on the signal, and amplify the signal before outputting the signal. In such aspects, the signal output by the transparent NTN device may be a repeated signal in which the waveform of the output signal is unchanged relative to the received signal.

In other aspects, the NTN device 622 and/or the second NTN device 632 may implement a regenerative payload. For example, a regenerative NTN device may have the ability to perform all of or part of the base station functions, such as transforming and amplifying a received signal via on-board processing before outputting a signal. In some such aspects, transformation of the received signal may refer to digital processing that may include demodulation, decoding, switching and/or routing, re-encoding, re-modulation, and/or filtering of the received signal.

In examples in which the NTN device implements a transparent payload, the transparent NTN device may communicate with the base station 602 via the gateway 628. In some such examples, the base station 602 may facilitate communication between the gateway 628 and the network node 606. In examples in which the NTN device implements a regenerative payload, the regenerative NTN device may have an on-board base station.

Example aspects present herein provide methods and apparatus to handle feeder link unavailability at the network (e.g., at a network node such as a base station). In some examples, when a network node, e.g., of an NTN, detects a feeder link failure, the source network node (e.g., a base station such a source gNB or other source network node) may send a handover request for each UE (or a single, combined handover request for all UEs served via the feeder link) to a potential target network node and may provide re-establishment information (e.g., the cell radio network temporary identifier (CRNTI) and shortened message authentication code-integrity (short-MAC-I)) of each UE to the target network node. The source network node may include a handover cause indicating that the handover request is based on a feeder link failure (e.g., cause=feeder_link_failure). Upon receiving the re-establishment information, the target network may prepare the new UE context prior to receiving a reestablishment request from the UE, and, based on the feeder link failure handover cause value and behavior, the target network may wait for a re-establishment request from the UE. As the feeder link is unavailable with the source network node (e.g., a source gNB, source base station, or other source network node), the UE detects radio link failure and tries to re-establish the connection with the potential neighbor network or the target network node (e.g., a target gNB, target base station, or other target network node), as provided in system information block (SIB) information. The UE may send the re-establishment request with the last CRNTI and short-MAC-I on the target network. At the target network node, the UE context can already be present based on the received CRNTI and short-MAC-I, when the UE requests reestablishment with the target network node, and the target network node may admit the UE without fetching the UE context from the source network. The target network node is able to send the re-establishment response to the UE without a further request for the UE context after receipt of the reestablishment request message from the UE. The proposed transfer of UE context to a potential target network node (e.g., such as a potential neighbor NTN cell) prior to the reestablishment request from the UE can reduce the latency for reestablishment with a target network node following a feeder link failure with a source network node.

In wireless communication systems, the efficient and reliable management of a connection for a UE improves a user experience. As described in connection with FIGS. 1, 2, and 5A-6, some wireless communication systems may provide service to some UEs via NTN components, e.g., such as a satellite. The intermittent feeder link availability can lead to changes in a serving base station for the UE. Mobility enhancement and fast connection recovery when the feeder link becomes unavailable are important in maintaining a high QoS. Additionally, reduction in power consumption at the UE during the connection recovery is helpful. A prolonged search for a re-connection may quickly drain the UE's power, and aspects presented herein reduce latency for UE reconnection and enables power savings at the UE.

Example aspects presented herein provide methods and apparatus for quicker connection recovery following link failures, such as feeder link failures.

In some aspects, such as in an NTN, a source network entity may be connected with a UE. For example, the source network entity may be the NTN device 502, the NTN device/base station 530, the NTN-DU 514, or the NTN devices 622, 632. The UE may be UE 505, 624. When the source network entity in an NTN detects a feeder link (e.g., feeder link 522, 626, 636) failure, the source network entity may send either a single handover request (for each UE) or a combined handover request (for all the UE) to the potential target network entity (e.g., a target base station) in the NTN. The target network entity may be another one of the NTN device 502, the NTN device/base station 530, the NTN-DU 514, or the NTN devices 622, 632 that is different from the source network entity. The source network entity may provide re-establishment information, such as the cell radio network temporary identifier (CRNTI) and shortened message authentication code-integrity (short-MAC-I) for each UE, to the target network entity. In some examples, the handover request may be sent using the new cause that indicates the feeder link failure as the causes of the handover (e.g., new XN Cause=feeder_link_failture). In some examples, the new cause may be included in one or more new information elements (IEs) of the handover request. Table 2 shows example IEs including the new cause of the feeder link failure.

TABLE 2

Example IEs showing the new cause of the feeder link failure

| | | |
|---|---|---|
| >Transport Layer | | |
| >>Transport Layer Cause | M | ENUMERATED {Transport Resource Unavailable, Feeder Link Failure, Unspecified, . . . } |

Upon receiving this information from the source network entity and before receiving any re-establishment request from the UE, the target network entity may prepare the new UE context. Then, based on the new cause value (e.g., new XN Cause=feeder_link_failture) and behavior, the target network entity may wait for a re-establishment request from the UE.

As the feeder link (e.g., feeder link 522, 626, 636) is not available with the source network entity (e.g., the NTN device 502, the NTN device/base station 530, the NTN-DU 514, or the NTN devices 622, 632), the UE (e.g., UE 505, 624) may detect a radio link failure and try to re-establish the connection with a potential neighbor network entity of the source network entity, such as the target network entity (which may be another the NTN device 502, the NTN device/base station 530, the NTN-DU 514, or the NTN devices 622, 632 that is different from the source network entity), using information provided in the system information block (SIB). When the UE sends out a re-establishment request, it may use the CRNTI and short-MAC-I on the target network entity.

An advantage here is that the target network entity, having already prepared the UE context with the received CRNTI and short-MAC-I, may immediately admit the UE, without fetching the UE context from the source network entity after the UE request and may send the re-establishment response to the UE with less latency. This approach results in faster connection re-reestablishment recovery, particularly in NTN scenarios where the target NTN is usually predetermined. Additionally, this approach may be applicable to terrestrial network (TN) situations, provided the target network entity is identifiable. For example, this approach may be applicable to the TN that involves one or more of the base station 602, the UE 604, the network node 606, or the gateway 628.

Figure 7:
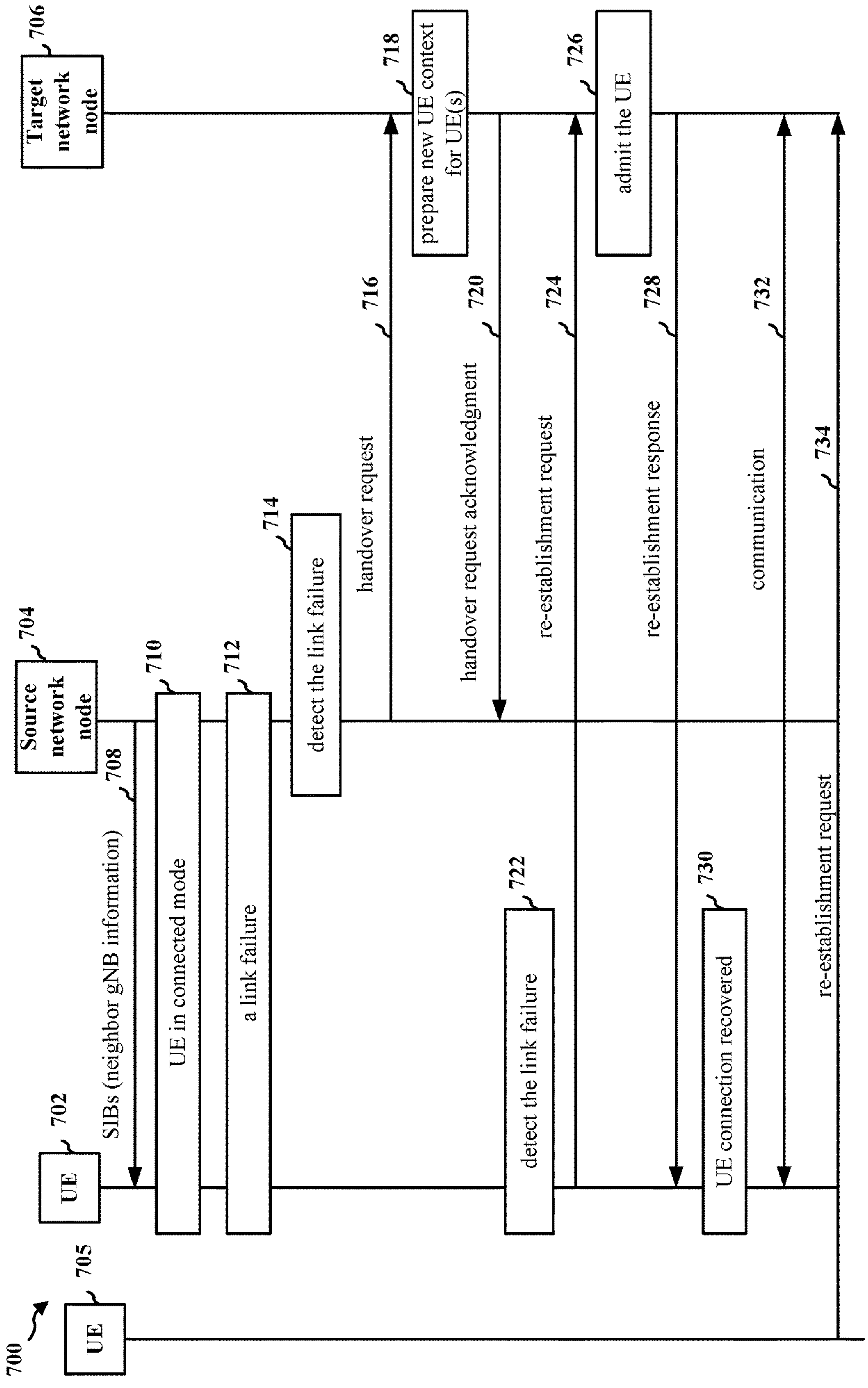
FIG. 7 is a call flow diagram illustrating a method of wireless communication in accordance with various aspects of the present disclosure.

FIG. 7 is a call flow diagram 700 illustrating a method of wireless communication in accordance with various aspects of this present disclosure. Various aspects are described in connection with a UE 702 and a source base station 704. The aspects may be performed by the UE 702, the source base station 704, or target base station 706 in aggregation and/or by one or more components of the source base station 704 or the target base station 706 (e.g., such as a CU 210, a DU 212, and/or an RU 214).

Although an example is described for an NTN to illustrate the concept, the concept may be similarly applied for a terrestrial network based on a detected link failure.

As shown in FIG. 7, at 708, the source base station 704 may transmit neighboring information of the source base station 704 to the UE 702 via one or more system information blocks (SIBs). The source base station 704 and the target base station 706 may each be the NTN device 502, the NTN device/base station 530, the NTN-DU 514, or the NTN devices 622, 632. The UE may be UE 505, 624. The neighboring information may include the information of one or more base stations neighboring the source base station 704. For the ease of the description, it is assumed that the target base station 706 is among the base stations neighboring the source base station 704. Hence, the neighboring information may include the information related to the base station 706.

At 710, the UE 702 may have a connection with the source base station 704, e.g., in a connected state with the source base station. In some aspects, the connection may be provided via a satellite, space vehicle, NTN device, or other NTN component, such as described in connection with any of FIG. 1, 2, 5A-C or 6. For example, the source base station may have a feeder link with the NTN node, and may transmit and receive communication with the UE by transmitting and receiving via the satellite over the feeder link.

At 712, there is a link failure. In some examples, the source base station 704 may be associated with a non-terrestrial network (NTN), and the link failure may be a feeder link failure, such as a failure on the feeder link 522 or 626. In some aspects, the link failure may be a link failure for a terrestrial network.

At 714, the source base station 704 may detect the link failure.

At 716, upon detecting the link failure (at 714), the source base station 704 may transmit a handover request to the target base station 706. In some examples, the handover request may be an individual handover request for the UE 702 associated with the source base station 704. In some aspects, the source base station may transmit an individual handover request (e.g., at 716) for each of multiple UEs (e.g., 702 and 705) served by the base station via the feeder link. In some examples, the handover request may be a combined handover request for a group of UEs (e.g., 702 and 705) including the UE 702 associated with the source base station 704. For example, a handover request may a combined handover request for all the UE 104 associated with a base station 102. The handover request may include the re-establishment information for the UE 702 (for a single handover request) or the re-establishment for each UE of the group of UE (for a combined handover request). The re-establishment information for a UE may include, for example, a cell radio network temporary identifier (CRNTI) and a shortened message authentication code-integrity (short-MAC-I) related to the UE. In some examples, the handover request may indicate that the cause of the handover is the link failure. For example, the link failure (e.g., the feeder link failure) may be included in an information element of the handover request.

At 718, after receiving the handover request form the source base station 704, the target base station 706 may prepare new UE context based on the received handover request. The UE context may refer to the information that the network stores for a UE, which may include, for example, QoS requirements, and information about the resource allocation (e.g., uplink and downlink bandwidth) of the UE.

At 720, the target base station 706 may transmit a handover request acknowledgement to the source base station 704, confirming the reception of the handover request.

At 722, as the link with the source base station 704 is unavailable, the UE 702 may detect the link failure (e.g., a radio link failure (RLF)). For example, when the feeder link 522 or 626 with the source base station (e.g., the NTN device 502, the NTN device/base station 530, the NTN-DU 514, or the NTN devices 622, 632) is unavailable, the UE 505 or 624 may detect the link failure.

At 724, upon detecting the link failure (at 722), the UE 702 may transmit a re-establishment request to the target base station 706 based on the neighboring information received at 708 from the source base station 704. In some examples, the re-establishment request may include the CRNTI and the short-MAC-I related to the UE. In some examples, the CRNTI and the short-MAC-I may be the last CRNTI and the last short-MAC-I related to the UE before the link failure (at 712).

At 726, since the UE context is already present with the received CRNTI and short-MAC-I, upon receiving the re-establishment request from the UE 702 at 724, the target base station 706 may admit the UE 702. That is, the target base station 706 may allow the admission of the UE 702 without needing to fetch the UE context from the source base station 704 as the UE context is already prepared (at 718) at the target base station 706. For example, with the prepared UE context, the target base station (which may be another one of the NTN device 502, the NTN device/base station 530, the NTN-DU 514, or the NTN devices 622, 632 differently from the source base station) may admit the UE 505 or 624 without fetching the UE context from the source base station after the request.

At 728, the target base station 706 may transmit a re-establishment response to the UE 702 based on having the UE context prepared at 718 prior to reception of the request at 724.

At 730, after the target base station 706 admits the UE 702, the UE 702 has a recovered connection with the network via the target base station 706.

At 732, the UE 702 may communicate with the target base station 706 based on the recovered connection. For example, the target base station (which may be another one of the NTN device 502, the NTN device/base station 530, the NTN-DU 514, or the NTN devices 622, 632 differently from the source base station) may communicate with the UE 505 or 624 based on the recovered connection. As illustrated at 734, the target base station may receive a reconnection request at a different time from another UE 705 that was served by the source base station. The target base station may similarly have a UE context for the UE 705 ready based on a prior handover request (e.g., at 716), and may respond with a re-establishment response to recover a connection with the UE 705 without sending a request for the UE context after receiving the reestablishment request 734

Figure 8:
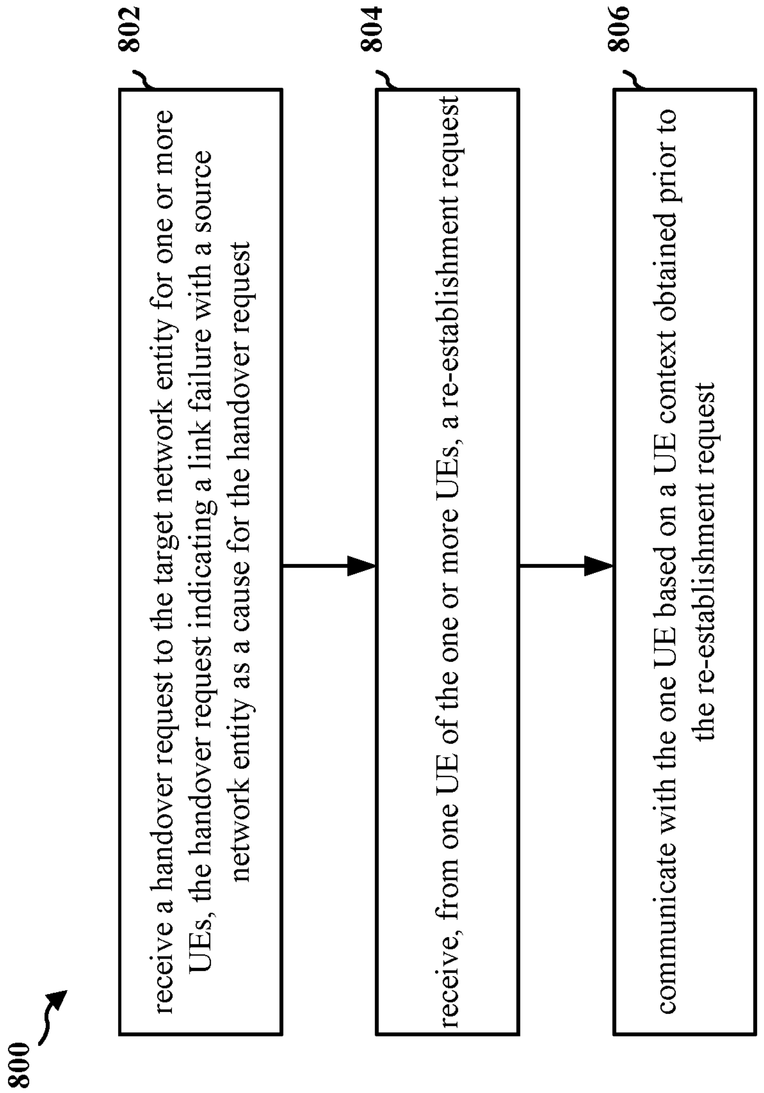
FIG. 8 is a flowchart illustrating methods of wireless communication at a UE in accordance with various aspects of the present disclosure.

FIG. 8 is a flowchart 800 illustrating methods of wireless communication at a target network entity in accordance with various aspects of the present disclosure. The method may be performed by the target network entity. The target network entity may be a base station, or a component of a base station, in the access network of FIG. 1 or a core network component (e.g., base station 102, 202, 410, 706; the NTN device 502, the NTN device/base station 530, the NTN-DU 514; the NTN devices 622, 632, or the network entity 1202 in the hardware implementation of FIG. 12). The methods allow a source network entity to signal a target network entity to prepare the UE context in anticipation of a potential handover when the source network entity detects a link failure with the UE. By doing so, the target network entity can be ready with the UE context even before it receives a re-establishment request from the UE. This results in lowered latency and quicker connection re-establishment and enhances the QoS in wireless communication.

As shown in FIG. 8, at 802, the target network entity may receive a handover request to the target network entity for one or more UEs. The handover request may indicate a link failure with a source network entity as a cause for the handover request. The UE may be the UE 104, 204, 450, 505, 604, 624, 702, or the apparatus 1204 in the hardware implementation of FIG. 12. The source network entity may be a base station, or a component of a base station, in the access network of FIG. 1 or a core network component (e.g., base station 102, 202, 410, 704; the NTN device 502, the NTN device/base station 530, the NTN-DU 514; the NTN devices 622, 632, or the network entity 1202 in the hardware implementation of FIG. 12). FIGS. 5A, 5B, 5C, 6, and 7 illustrate various aspects of the steps in connection with flowchart 800. For example, referring to FIG. 7, the target network entity (target base station 706) may receive, at 714, a handover request to the target network entity (target base station 706) for one or more UEs (e.g., UE 702). The handover request may indicate a link failure (e.g., the link failure at 712) with a source network entity (source base station 704) as the cause for the handover request. In some examples, the link failure may be the failure on the feeder link 522, 626, or 636. In some aspects, 802 may be performed by the link recovery component 199.

At 804, the target network entity may receive, from one UE of the one or more UEs, a re-establishment request. For example, referring to FIG. 7, the target network entity (target base station 706) may receive, at 724, from one UE of the one or more UEs (e.g., UE 702), a re-establishment request. In some aspects, 804 may be performed by the link recovery component 199.

At 806, the target network entity may communicate with the one UE based on a UE context obtained prior to the re-establishment request. For example, referring to FIGS. 5A, 6, and 7, the target network entity (target base station 706) may, at 732, communicate with the one UE (e.g., UE 702) based on a UE context obtained (e.g., received via the handover request at 716) prior to the re-establishment request (received at 724). For example, the target network entity (which may be the NTN device 502, the NTN device/base station 530, the NTN-DU 514, or the NTN devices 622, 632 differently from the source network entity) may communicate with the UE 505 or 624 based on the recovered connection. In some aspects, 806 may be performed by the link recovery component 199.

Figure 9:
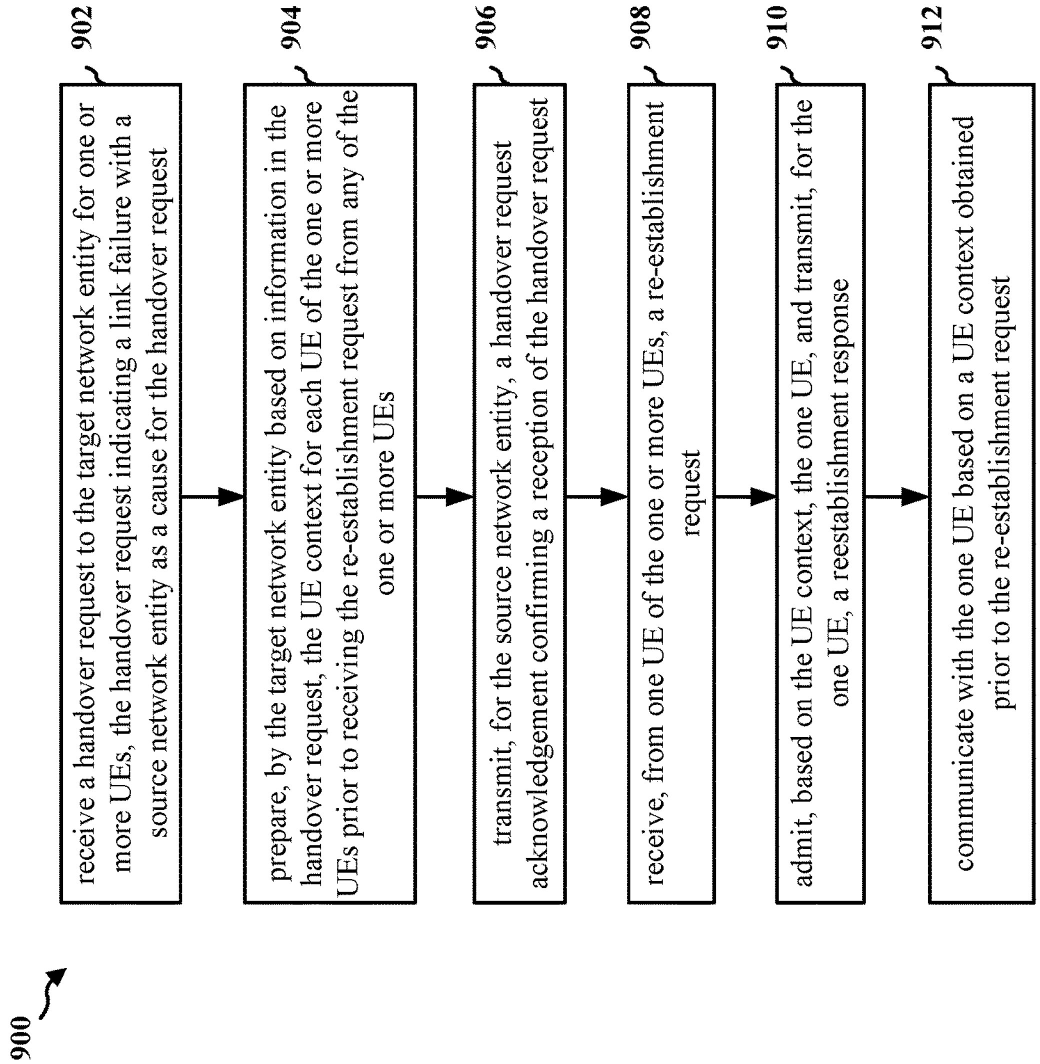
FIG. 9 is a flowchart illustrating methods of wireless communication at a UE in accordance with various aspects of the present disclosure.

FIG. 9 is a flowchart 900 illustrating methods of wireless communication at a target network entity in accordance with various aspects of the present disclosure. The method may be performed by the target network entity. The target network entity may be a base station, or a component of a base station, in the access network of FIG. 1 or a core network component (e.g., base station 102, 202, 410, 706; the NTN device 502, the NTN device/base station 530, the NTN-DU 514; the NTN devices 622, 632, or the network entity 1202 in the hardware implementation of FIG. 12). The methods allow a source network entity to signal a target network entity to prepare the UE context in anticipation of a potential handover when the source network entity detects a link failure with the UE. By doing so, the target network entity can be ready with the UE context even before it receives a re-establishment request from the UE. This results in lowered latency and quicker connection re-establishment and enhances the QoS in wireless communication.

As shown in FIG. 9, at 902, the target network entity may receive a handover request to the target network entity for one or more UEs. The handover request may indicate a link failure with a source network entity as a cause for the handover request. The UE may be the UE 104, 204, 450, 505, 604, 624, 702, or the apparatus 1204 in the hardware implementation of FIG. 12. The source network entity may be a base station, or a component of a base station, in the access network of FIG. 1 or a core network component (e.g., base station 102, 202, 410, 704; the NTN device 502, the NTN device/base station 530, the NTN-DU 514; the NTN devices 622, 632, or the network entity 1202 in the hardware implementation of FIG. 12). FIGS. 5A, 5B, 5C, 6, and 7 illustrate various aspects of the steps in connection with flowchart 900. For example, referring to FIG. 7, the target network entity (target base station 706) may receive, at 714, a handover request to the target network entity (target base station 706) for one or more UEs (e.g., UE 702). The handover request may indicate a link failure (e.g., the link failure at 712) with a source network entity (source base station 704) as the cause for the handover request. In some examples, the link failure may be the failure on the feeder link 522, 626, or 636. In some aspects, 902 may be performed by the link recovery component 199.

At 908, the target network entity may receive, from one UE of the one or more UEs, a re-establishment request. For example, referring to FIG. 7, the target network entity (target base station 706) may receive, at 724, from one UE of the one or more UEs (e.g., UE 702), a re-establishment request. In some aspects, 908 may be performed by the link recovery component 199.

At 912, the target network entity may communicate with the one UE based on a UE context obtained prior to the re-establishment request. For example, referring to FIGS. 5A, 6, and 7, the target network entity (target base station 706) may, at 732, communicate with the one UE (e.g., UE 702) based on a UE context obtained (e.g., received via the handover request at 716) prior to the re-establishment request (received at 724). For example, the target network entity (which may be the NTN device 502, the NTN device/base station 530, the NTN-DU 514, or the NTN devices 622, 632 differently from the source network entity) may communicate with the UE 505 or 624 based on the recovered connection. In some aspects, 912 may be performed by the link recovery component 199.

In some aspects, at 904, the target network entity may prepare, based on information in the handover request, the UE context for each UE of the one or more UEs prior to receiving the re-establishment request from any of the one or more UEs. For example, referring to FIG. 7, the target network entity (target base station 706) may prepare, at 718, based on information in the handover request (received at 716), the UE context for each UE (e.g., UE 702) of the one or more UEs prior to receiving the re-establishment request (at 724) from any of the one or more UEs. In some aspects, 904 may be performed by the link recovery component 199.

In some aspects, the source network entity may be associated with an NTN, and the link failure may be a feeder link failure. For example, referring to FIGS. 5A, 6, and 7, the source network entity (source base station 704) may be associated with an NTN, and the link failure (at 712) may be a feeder link failure (e.g., the failure on the feeder link 522, 626, or 636).

In some aspects, the feeder link failure may be included in an information element of the handover request. For example, the information element may indicate the feeder link failure as the cause of the handover. For example, referring to FIG. 7, the feeder link failure may be included in an IE of the handover request (at 716). Referring to Table 2, the handover request may include an IE that indicates link failure (e.g., feeder link failure) as the cause of the handover request.

In some aspects, the source network entity is associated with a terrestrial network (TN). For example, referring to FIGS. 6 and 7, the source network entity (source base station 704) may be associated with a TN, such as the TN that involves one or more of the base station 602, the UE 604, the network node 606, or the gateway 628.

In some aspects, the handover request may be a combined handover request and includes re-establishment information for each UE of the one or more UEs. For example, referring to FIG. 7, the handover request (at 716) may be a combined handover request and includes re-establishment information for each UE of the one or more UEs (e.g., the UEs related to the source base station 704). For example, the combined handover request may include re-establishment information for all the UE 104 associated with a base station 102.

In some aspects, the re-establishment information may include a CRNTI and a short-MAC-I for each UE of the one or more UEs. For example, referring to FIG. 7, the re-establishment information (included in the handover request at 716) may include a CRNTI and a short-MAC-I for each UE of the one or more UEs.

In some aspects, the CRNTI and the short-MAC-I for each UE of the one or more UEs may be the last CRNTI and the last short-MAC-I for each UE before the link failure. For example, referring to FIG. 7, the CRNTI and the short-MAC-I for each UE of the one or more UEs (included in the handover request at 716) may be the last CRNTI and the last short-MAC-I for each UE before the link failure at 712.

In some aspects, the handover request may be for multiple UEs of the one or more UEs. For example, referring to FIG. 7, the handover request (at 716) may be for multiple UEs of the one or more UEs (e.g., multiple UEs related to the source base station 704). For example, a handover request may be a combined handover request for all the UE 104 associated with a base station 102.

In some aspects, at 910, the target network entity may admit the one UE based on the UE context and transmit a re-establishment response for the one UE. For example, referring to FIG. 7, the target network entity (target base station 706) may admit, at 726 the one UE (e.g., UE 702) based on the UE context (at 718) and transmit, at 728, a re-establishment response for the one UE (e.g., UE 702). For example, with the prepared UE context, the target network entity (which may be the NTN device 502, the NTN device/base station 530, the NTN-DU 514, or the NTN devices 622, 632 differently from the source base station) may admit the UE 505 or 624 without the need to fetch the UE context from the source network entity. In some aspects, 910 may be performed by the link recovery component 199.

In some aspects, at 906, the target entity may transmit, for the source network entity, a handover request acknowledgement confirming the reception of the handover request. For example, referring to FIG. 7, the target network entity (target base station 706) may transmit, at 720, for the source network entity (source base station 704), a handover request acknowledgement confirming the reception of the handover request (at 716). In some aspects, 906 may be performed by the link recovery component 199.

Figure 10:
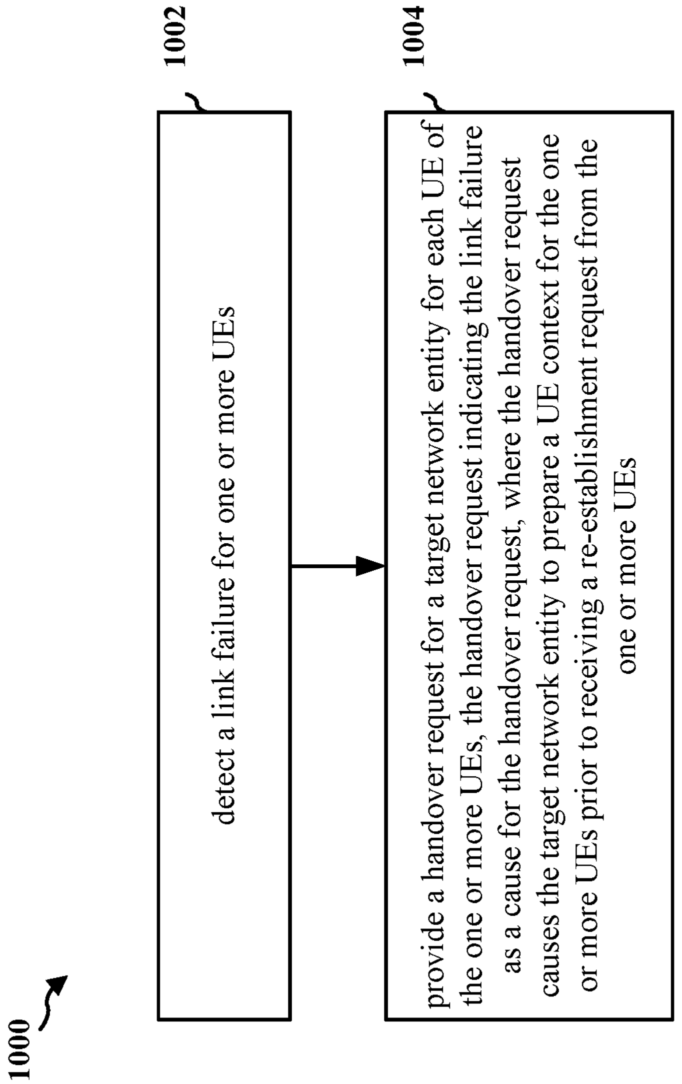
FIG. 10 is a flowchart illustrating methods of wireless communication at a network entity in accordance with various aspects of the present disclosure.

FIG. 10 is a flowchart 1000 illustrating methods of wireless communication at a source network entity in accordance with various aspects of the present disclosure. The method may be performed by the source network entity. The source network entity may be a base station, or a component of a base station, in the access network of FIG. 1 or a core network component (e.g., base station 102, 202, 410, 704; the NTN device 502, the NTN device/base station 530, the NTN-DU 514; the NTN devices 622, 632, or the network entity 1202 in the hardware implementation of FIG. 12). The methods allow a source network entity to signal a target network entity to prepare the UE context in anticipation of a potential handover when the source network entity detects a link failure with the UE. By doing so, the target network entity can be ready with the UE context even before it receives a re-establishment request from the UE. This results in lowered latency and quicker connection re-establishment and enhances the QoS in wireless communication.

As shown in FIG. 10, at 1002, the source network entity may detect a link failure for one or more UEs. The UE may be the UE 104, 204, 450, 505, 604, 624, 702, or the apparatus 1204 in the hardware implementation of FIG. 12. FIGS. 5A, 5B, 5C, 6, and 7 illustrate various aspects of the steps in connection with flowchart 1000. For example, referring to FIG. 7, the source network entity (source base station 704) may, at 714, detect a link failure for one or more UEs (e.g., UE 702). For example, the link failure may be the failure on the feeder link 522, 626, or 636. In some aspects, 1002 may be performed by the link recovery component 199.

At 1004, the source network entity may provide a handover request for a target network entity for each UE of the one or more UEs. The handover request may indicate the link failure as a cause for the handover request, and the handover request may cause the target network entity to prepare a UE context for the one or more UEs prior to receiving a re-establishment request from the one or more UEs. The target network entity may be a base station, or a component of a base station, in the access network of FIG. 1 or a core network component (e.g., base station 102, 202, 410, 706; the NTN device 502, the NTN device/base station 530, the NTN-DU 514; the NTN devices 622, 632, or the network entity 1202 in the hardware implementation of FIG. 12). For example, referring to FIG. 7, the source network entity (source base station 704) may, at 716, provide a handover request for a target network entity (target base station 706) for each UE (e.g., UE 702) of the one or more UEs. The handover request (at 716) may indicate the link failure as a cause for the handover request, and the handover request may cause the target network entity (target base station 706) to prepare a UE context (at 718) for the one or more UEs (e.g., UE 702) prior to receiving a re-establishment request (at 720) from the one or more UEs (e.g., UE 702). For example, the handover request may indicate the link failure (e.g., the failure on feeder link 522, 626, or 636) as a cause for the handover request, and the handover request may cause the target network entity (which may be the NTN device 502, the NTN device/base station 530, the NTN-DU 514, or the NTN devices 622, 632 differently from the source network entity) to prepare a UE context for the one or more UEs prior to receiving a re-establishment request from the one or more UEs. In some aspects, 1004 may be performed by the link recovery component 199.

Figure 11:
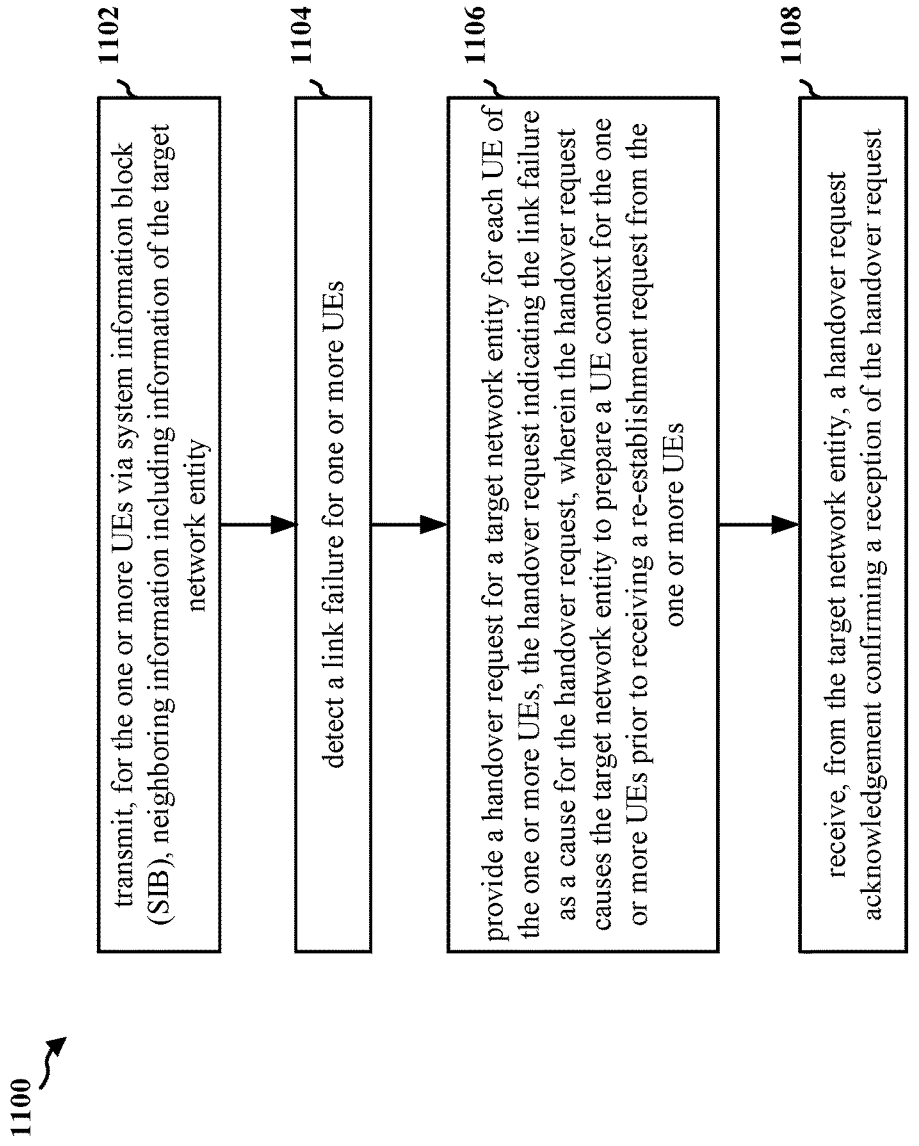
FIG. 11 is a flowchart illustrating methods of wireless communication at a network entity in accordance with various aspects of the present disclosure.

FIG. 11 is a flowchart 1100 illustrating methods of wireless communication at a source network entity in accordance with various aspects of the present disclosure. The method may be performed by the source network entity. The source network entity may be a base station, or a component of a base station, in the access network of FIG. 1 or a core network component (e.g., base station 102, 202, 410, 704; the NTN device 502, the NTN device/base station 530, the NTN-DU 514; the NTN devices 622, 632, or the network entity 1202 in the hardware implementation of FIG. 12). The methods allow a source network entity to signal a target network entity to prepare the UE context in anticipation of a potential handover when the source network entity detects a link failure with the UE. By doing so, the target network entity can be ready with the UE context even before it receives a re-establishment request from the UE. This results in lowered latency and quicker connection re-establishment and enhances the QoS in wireless communication.

As shown in FIG. 11, at 1104, the source network entity may detect a link failure for one or more UEs. The UE may be the UE 104, 204, 450, 505, 604, 624, 702, or the apparatus 1204 in the hardware implementation of FIG. 12. FIGS. 5A, 5B, 5C, 6, and 7 illustrate various aspects of the steps in connection with flowchart 1100. For example, referring to FIG. 7, the source network entity (source base station 704) may, at 714, detect a link failure for one or more UEs (e.g., UE 702). For example, the link failure may be the failure on the feeder link 522, 626, or 636. In some aspects, 1104 may be performed by the link recovery component 199.

At 1106, the source network entity may provide a handover request for a target network entity for each UE of the one or more UEs. The handover request may indicate the link failure as a cause for the handover request, and the handover request may cause the target network entity to prepare a UE context for the one or more UEs prior to receiving a re-establishment request from the one or more UEs. The target network entity may be a base station, or a component of a base station, in the access network of FIG. 1 or a core network component (e.g., base station 102, 202, 410, 706; the NTN device 502, the NTN device/base station 530, the NTN-DU 514; the NTN devices 622, 632, or the network entity 1202 in the hardware implementation of FIG. 12). For example, referring to FIG. 7, the source network entity (source base station 704) may, at 716, provide a handover request for a target network entity (target base station 706) for each UE (e.g., UE 702) of the one or more UEs. The handover request (at 716) may indicate the link failure as a cause for the handover request, and the handover request may cause the target network entity (target base station 706) to prepare a UE context (at 718) for the one or more UEs (e.g., UE 702) prior to receiving a re-establishment request (at 720) from the one or more UEs (e.g., UE 702). For example, the handover request may indicate the link failure (e.g., the failure on feeder link 522, 626, or 636) as a cause for the handover request, and the handover request may cause the target network entity (which may be the NTN device 502, the NTN device/base station 530, the NTN-DU 514, or the NTN devices 622, 632 differently from the source network entity) to prepare a UE context for the one or more UEs prior to receiving a re-establishment request from the one or more UEs. In some aspects, 1106 may be performed by the link recovery component 199.

In some aspects, the source network entity may be associated with a non-terrestrial network (NTN), and the link failure may be a feeder link failure. For example, referring to FIGS. 5A, 6, and 7, the source network entity (source base station 704) may be associated with an NTN, and the link failure (at 712) may be a feeder link failure (e.g., the failure on the feeder link 522, 626, or 636).

In some aspects, the feeder link failure may be included in an information element of the handover request. For example, the information element may indicate the feeder link failure as the cause of the handover. For example, referring to FIG. 7, the feeder link failure may be included in an IE of the handover request (at 716). Referring to Table 2, the handover request may include an IE that indicates link failure (e.g., feeder link failure) as the cause of the handover request.

In some aspects, the source network entity may be associated with a terrestrial network (TN). For example, referring to FIGS. 6 and 7, the source network entity (source base station 704) may be associated with a TN, such as the TN that involves one or more of the base station 602, the UE 604, the network node 606, or the gateway 628.

In some aspects, to provide the handover request for the target network entity (at 1106), the source network entity may provide the handover request for the target network entity independent of a request from the target network entity. For example, referring to FIG. 7, the source network entity (source base station 704) may provide, at 716, the handover request for the target network entity (target base station 706) without any request from the target network entity (target base station 706).

In some aspects, the handover request may be a combined request and includes re-establishment information for each UE of the one or more UEs. For example, referring to FIG. 7, the handover request (at 716) may be a combined handover request and includes re-establishment information for each UE of the one or more UEs (e.g., the UEs related to the source base station 704). For example, the combined handover request may include re-establishment information for all the UE 104 associated with a base station 102.

In some aspects, the re-establishment information may include a CRNTI and a short-MAC-I for each UE of the one or more UEs. For example, referring to FIG. 7, the re-establishment information (included in the handover request at 716) may include a CRNTI and a short-MAC-I for each UE of the one or more UEs.

In some aspects, the CRNTI and the short-MAC-I for each UE of the one or more UEs may be the last CRNTI and the last short-MAC-I for each UE before the link failure. For example, referring to FIG. 7, the CRNTI and the short-MAC-I for each UE of the one or more UEs (included in the handover request at 716) may be the last CRNTI and the last short-MAC-I for each UE before the link failure at 712.

In some aspects, the handover request is for multiple UEs of the one or more UE. For example, referring to FIG. 7, the handover request (at 716) may be for multiple UEs of the one or more UEs (e.g., multiple UEs related to the source base station 704). For example, a handover request may a combined handover request for all the UE 104 associated with a base station 102.

In some aspects, at 1108, the source network entity may receive, from the target network entity, a handover request acknowledgement confirming the reception of the handover request. For example, referring to FIG. 7, the source network entity (source base station 704) may, at 720, receive, from the target network entity (target base station 706), a handover request acknowledgement confirming the reception of the handover request (at 716). In some aspects, 1108 may be performed by the link recovery component 199.

In some aspects, at 1102, the source network entity may transmit, for the one or more UEs via SIB, neighboring information including information of the target network entity. For example, referring to FIG. 7, the source network entity (source base station 704) may, at 708, transmit, for the one or more UEs (e.g., UE 702) via SIB, neighboring information including information of the target network entity (target base station 706). In some aspects, 1102 may be performed by the link recovery component 199.

Figure 12:
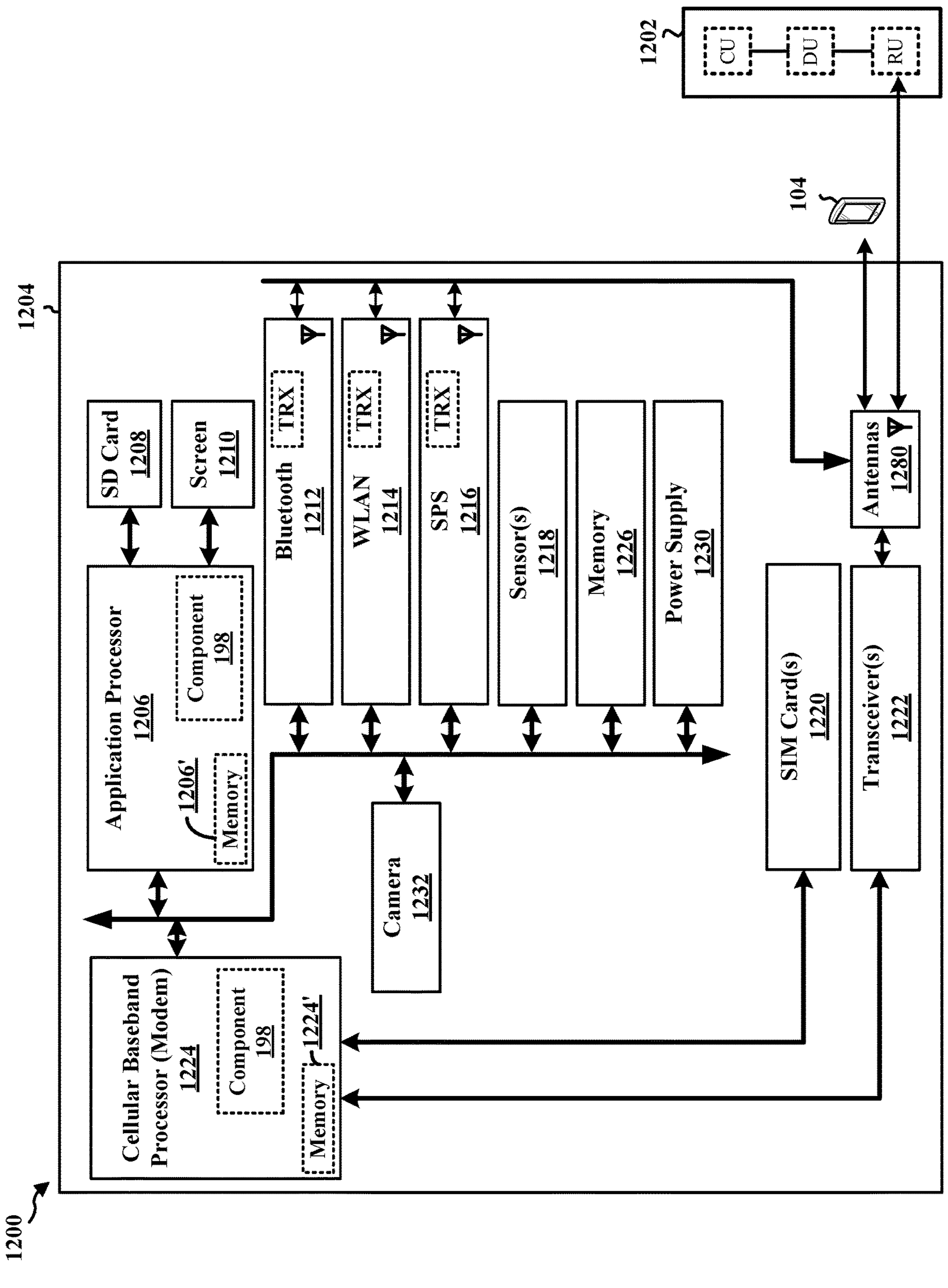
FIG. 12 is a diagram illustrating an example of a hardware implementation for an example apparatus and/or network entity.

FIG. 12 is a diagram 1200 illustrating an example of a hardware implementation for an apparatus 1204. The apparatus 1204 may be a UE, a component of a UE, or may implement UE functionality. In some aspects, the apparatus 1204 may include at least one cellular baseband processor 1224 (also referred to as a modem) coupled to one or more transceivers 1222 (e.g., cellular RF transceiver). The cellular baseband processor 1224 may include on-chip memory 1224'. In some aspects, the apparatus 1204 may further include one or more subscriber identity modules (SIM) cards 1220 and an application processor 1206 coupled to a secure digital (SD) card 1208 and a screen 1210. The application processor 1206 may include on-chip memory 1206'. In some aspects, the apparatus 1204 may further include a Bluetooth module 1212, a WLAN module 1214, an SPS module 1216 (e.g., GNSS module), one or more sensor modules 1218 (e.g., barometric pressure sensor/altimeter; motion sensor such as inertial measurement unit (IMU), gyroscope, and/or accelerometer(s); magnetometer, audio and/or other technologies used for positioning), additional memory modules 1226, a power supply 1230, and/or a camera 1232. The Bluetooth module 1212, the WLAN module 1214, and the SPS module 1216 may include an on-chip transceiver (TRX) (or in some cases, just a receiver (RX)). The Bluetooth module 1212, the WLAN module 1214, and the SPS module 1216 may include their own dedicated antennas and/or utilize the antennas 1280 for communication. The cellular baseband processor 1224 communicates through the transceiver(s) 1222 via one or more antennas 1280 with the UE 104 and/or with an RU associated with a network entity 1202. The cellular baseband processor 1224 and the application processor 1206 may each include a computer-readable medium/memory 1224', 1206', respectively. The additional memory modules 1226 may also be considered a computer-readable medium/memory. Each computer-readable medium/memory 1224', 1206', 1226 may be non-transitory. The cellular baseband processor 1224 and the application processor 1206 are each responsible for general processing, including the execution of software stored on the computer-readable medium/memory. The software, when executed by the cellular baseband processor 1224/application processor 1206, causes the cellular baseband processor 1224/application processor 1206 to perform the various functions described supra. The computer-readable medium/memory may also be used for storing data that is manipulated by the cellular baseband processor 1224/application processor 1206 when executing software. The cellular baseband processor 1224/application processor 1206 may be a component of the UE 450 and may include the at least one memory 460 and/or at least one of the TX processor 468, the RX processor 456, and the controller/processor 459. In one configuration, the apparatus 1204 may be a processor chip (modem and/or application) and include just the cellular baseband processor 1224 and/or the application processor 1206, and in another configuration, the apparatus 1204 may be the entire UE (e.g., see UE 450 of FIG. 4) and include the additional modules of the apparatus 1204.

The component 198 may be within the cellular baseband processor(s) (or processing circuitry) 1224, the application processor(s) (or processing circuitry) 1206, or both the cellular baseband processor(s) (or processing circuitry) 1224 and the application processor(s) (or processing circuitry) 1206. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. As shown, the apparatus 1204 may include a variety of components configured for various functions. In one configuration, the apparatus 1204, and in particular the cellular baseband processor(s) (or processing circuitry) 1224 and/or the application processor(s) (or processing circuitry) 1206. As described supra, the apparatus 1204 may include the TX processor 468, the RX processor 456, and the controller/processor 459. As such, in one configuration, the means may be the TX processor 468, the RX processor 456, and/or the controller/processor 459 configured to perform the functions recited by the means.

Figure 13:
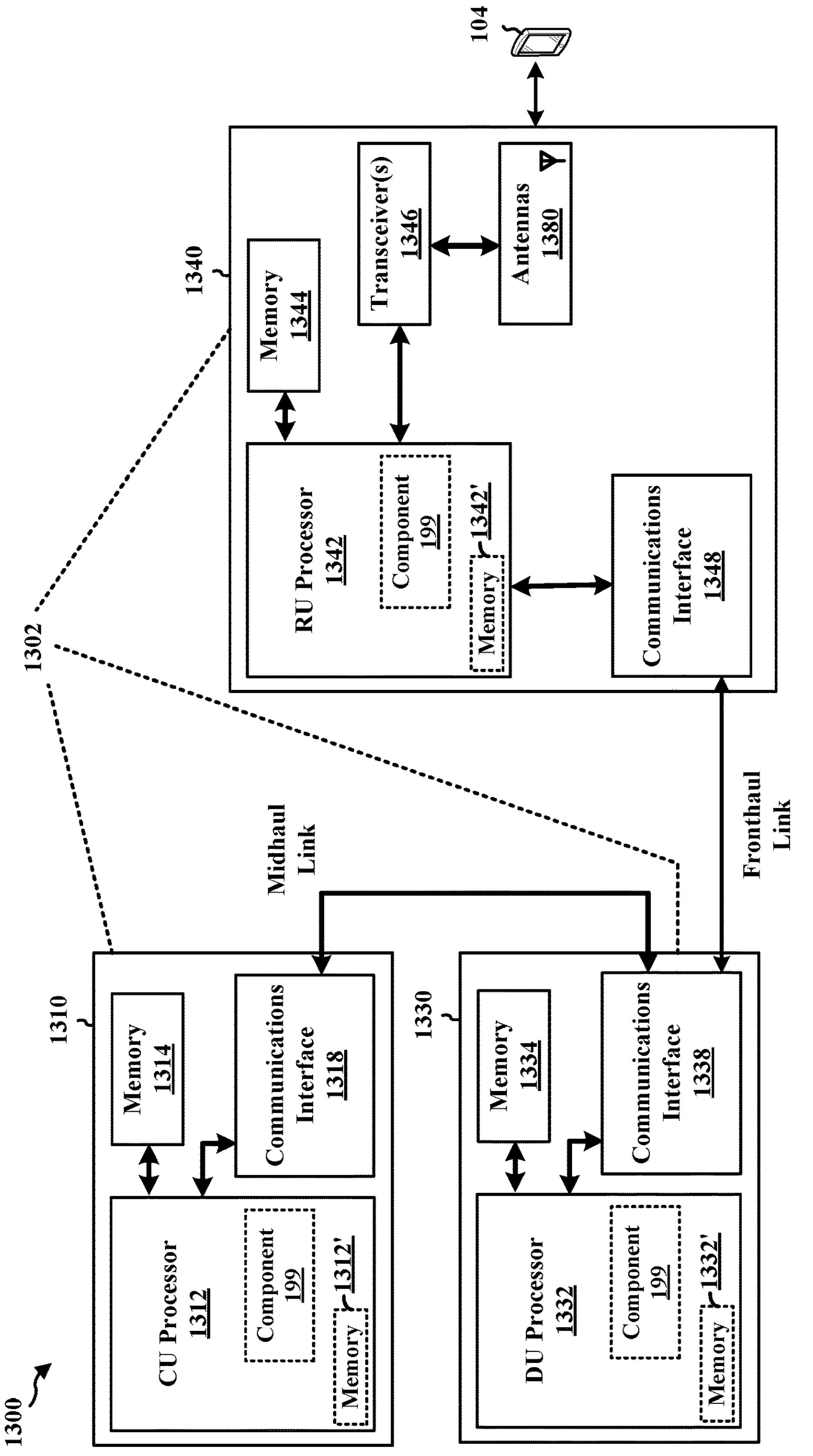
FIG. 13 is a diagram illustrating an example of a hardware implementation for an example network entity.

FIG. 13 is a diagram 1300 illustrating an example of a hardware implementation for a network entity 1302. The network entity 1302 may be a BS, a component of a BS, or may implement BS functionality. The network entity 1302 may include at least one of a CU 1310, a DU 1330, or an RU 1340. For example, depending on the layer functionality handled by the component 199, the network entity 1302 may include the CU 1310; both the CU 1310 and the DU 1330; each of the CU 1310, the DU 1330, and the RU 1340; the DU 1330; both the DU 1330 and the RU 1340; or the RU 1340. The CU 1310 may include at least one CU processor (or processing circuitry) 1312. The CU processor(s) (or processing circuitry) 1312 may include on-chip memory (or memory circuitry) 1312'. In some aspects, the CU 1310 may further include additional memory modules 1314 and a communications interface 1318. The CU 1310 communicates with the DU 1330 through a midhaul link, such as an F1 interface. The DU 1330 may include at least one DU processor (or processing circuitry) 1332. The DU processor(s) (or processing circuitry) 1332 may include on-chip memory (or memory circuitry) 1332'. In some aspects, the DU 1330 may further include additional memory modules 1334 and a communications interface 1338. The DU 1330 communicates with the RU 1340 through a fronthaul link. The RU 1340 may include at least one RU processor (or processing circuitry) 1342. The RU processor(s) (or processing circuitry) 1342 may include on-chip memory (or memory circuitry) 1342'. In some aspects, the RU 1340 may further include additional memory modules 1344, one or more transceivers 1346, antennas 1380, and a communications interface 1348. The RU 1340 communicates with the UE 104. The on-chip memory (or memory circuitry) 1312', 1332', 1342' and the additional memory modules 1314, 1334, 1344 may each be considered a computer-readable medium/memory (or memory circuitry). Each computer-readable medium/memory (or memory circuitry) may be non-transitory. Each of the processors (or processing circuitry) 1312, 1332, 1342 is responsible for general processing, including the execution of software stored on the computer-readable medium/memory (or memory circuitry). The software, when executed by the corresponding processor(s) (or processing circuitry) causes the processor(s) (or processing circuitry) to perform the various functions described supra. The computer-readable medium/memory (or memory circuitry) may also be used for storing data that is manipulated by the processor(s) (or processing circuitry) when executing software.

As discussed supra, in some aspects, the component 199 may be configured to receive a handover request to the target network entity for one or more UEs, the handover request indicating a link failure with a source network entity as a cause for the handover request; receive, from one UE of the one or more UEs, a re-establishment request; and communicate with the one UE based on a UE context obtained prior to the re-establishment request. In some aspects, the component 199 may be configured to detect a link failure for one or more UEs; and provide a handover request for a target network entity for each UE of the one or more UEs, the handover request indicating the link failure as a cause for the handover request, where the handover request causes the target network entity to prepare a UE context for the one or more UEs prior to receiving a re-establishment request from the one or more UEs. The component 199 may be further configured to perform any of the aspects described in connection with the flowcharts in FIG. 8, FIG. 9, FIG. 10 and FIG. 11, and/or performed by the source base station 704 or the target base station 706 in FIG. 7. The component 199 may be within one or more processors (or processing circuitry) of one or more of the CU 1310, DU 1330, and the RU 1340. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. The network entity 1302 may include a variety of components configured for various functions. In one configuration, the network entity 1302 includes means for receiving a handover request to the target network entity for one or more UEs, the handover request indicating a link failure with a source network entity as a cause for the handover request, means for receiving, from one UE of the one or more UEs, a re-establishment request, and means for communicating with the one UE based on a UE context obtained prior to the re-establishment request. In one configuration, the network entity 1302 includes means for detecting a link failure for one or more UEs, and means for providing a handover request for a target network entity for each UE of the one or more UEs, the handover request indicating the link failure as a cause for the handover request, where the handover request causes the target network entity to prepare a UE context for the one or more UEs prior to receiving a re-establishment request from the one or more UEs. The network entity 1302 may further include means for performing any of the aspects described in connection with the flowcharts in FIG. 8, FIG. 9, FIG. 10 and FIG. 11, and/or aspects performed by the source base station 704 or by the target base station 706 in FIG. 7. The means may be the component 199 of the network entity 1302 configured to perform the functions recited by the means. As described supra, the network entity 1302 may include the TX processor 416, the RX processor 470, and the controller/processor 475. As such, in one configuration, the means may be the TX processor 416, the RX processor 470, and/or the controller/processor 475 configured to perform the functions recited by the means.

This disclosure provides a method for wireless communication at a target network entity. The method may include receiving a handover request to the target network entity for one or more UEs, the handover request indicating a link failure with a source network entity as a cause for the handover request; receiving, from one UE of the one or more UEs, a re-establishment request; and communicating with the one UE based on a UE context obtained prior to the re-establishment request. The methods allow a source network entity to signal a target network entity to prepare the UE context in anticipation of a potential handover when the source network entity detects a link failure with the UE. By doing so, the target network entity can be ready with the UE context even before it receives a re-establishment request from the UE. This results in lowered latency and quicker connection re-establishment and enhances the QoS in wireless communication.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. When at least one processor is configured to perform a set of functions, the at least one processor, individually or in any combination, is configured to perform the set of functions. Accordingly, each processor of the at least one processor may be configured to perform a particular subset of the set of functions, where the subset is the full set, a proper subset of the set, or an empty subset of the set. A processor may be referred to as processor circuitry. A memory/memory module may be referred to as memory circuitry. If a first apparatus receives data from or transmits data to a second apparatus, the data may be received/transmitted directly between the first and second apparatuses, or indirectly between the first and second apparatuses through a set of apparatuses. A device configured to "output" data or "provide" data, such as a transmission, signal, or message, may transmit the data, for example with a transceiver, or may send the data to a device that transmits the data. A device configured to "obtain" data, such as a transmission, signal, or message, may receive, for example with a transceiver, or may obtain the data from a device that receives the data. Information stored in a memory includes instructions and/or data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device,"

and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a target network entity. The method includes receiving a handover request to the target network entity for one or more user equipment (UEs), the handover request indicating a link failure with a source network entity as a cause for the handover request; receiving, from one UE of the one or more UEs, a re-establishment request; and communicating with the one UE based on a UE context obtained prior to the re-establishment request.

Aspect 2 is the method of aspect 1, where the method may further include preparing, by the target network entity based on information in the handover request, the UE context for each UE of the one or more UEs prior to receiving the re-establishment request from any of the one or more UEs.

Aspect 3 is the method of any of aspects 1 to 2, where the source network entity may be associated with a non-terrestrial network (NTN), and the link failure may be a feeder link failure.

Aspect 4 is the method of aspect 3, where the feeder link failure may be included in an information element of the handover request.

Aspect 5 is the method of any of aspects 1 to 2, where the source network entity may be associated with a terrestrial network (TN).

Aspect 6 is the method of any of aspects 1 to 2, where the handover request may be a combined handover request and includes re-establishment information for each UE of the one or more UEs.

Aspect 7 is the method of aspect 6, where the re-establishment information may include a cell radio network temporary identifier (CRNTI) and a shortened message authentication code-integrity (short-MAC-I) for each UE of the one or more UEs.

Aspect 8 is the method of aspect 7, where the CRNTI and the short-MAC-I for each UE of the one or more UEs may be the last CRNTI and a last short-MAC-I for each UE before the link failure.

Aspect 9 is the method of any of aspects 1 to 2, where the handover request may be for multiple UEs of the one or more UEs.

Aspect 10 is the method of any of aspects 1 to 2, where the method may further include prior to communicating with the one UE: admitting, based on the UE context, the one UE; and transmitting, for the one UE, a re-establishment response.

Aspect 11 is the method of any of aspects 1 to 2, where the method may further include, after preparing the UE context for each UE of the one or more UEs: transmitting, for the source network entity, a handover request acknowledgement confirming the reception of the handover request.

Aspect 12 is an apparatus for wireless communication at a target network entity, comprising: a processing system that includes processor circuitry and memory circuitry that stores code and is coupled with the processor circuitry, the processing system configured to cause the target network entity to perform the method of one or more of Aspects 1-11.

Aspect 13 is an apparatus for wireless communication at a target network entity, comprising: one or more memories; and one or more processors coupled to the one or more memories and based on stored information that is stored in the one or more memories, the at one or more processors, individually or in any combination, are configured to cause the target network entity to perform the method of any of aspects 1-11.

Aspect 14 is the apparatus for wireless communication at a target network entity, comprising means for performing each step in the method of any of aspects 1-11.

Aspect 15 is an apparatus of any of aspects 12-14, further comprising a transceiver configured to receive or to transmit in association with the method of any of aspects 1-11.

Aspect 16 is a computer-readable medium (e.g., a non-transitory computer-readable medium) storing computer executable code at a target network entity, the code when executed by at least one processor causes the at target network entity to perform the method of any of aspects 1-11.

Aspect 17 is a method of wireless communication at a source network entity. The method includes detecting a link failure for one or more user equipment (UEs); and providing a handover request for a target network entity for each UE of the one or more UEs, the handover request indicating the link failure as a cause for the handover request, wherein the handover request causes the target network entity to prepare a UE context for the one or more UEs prior to receiving a re-establishment request from the one or more UEs.

Aspect 18 is the method of aspect 17, where the source network entity may be associated with a non-terrestrial network (NTN), and the link failure may be a feeder link failure.

Aspect 19 is the method of aspect 18, where the feeder link failure may be included in an information element of the handover request.

Aspect 20 is the method of aspect 17, where the source network entity may be associated with a terrestrial network (TN).

Aspect 21 is the method of any of aspects 17 to 20, wherein providing the handover request for the target network entity comprises: providing the handover request for the target network entity independent of a request from the target network entity.

Aspect 22 is the method of any of aspects 17 to 21, wherein the handover request may be a combined request and may include re-establishment information for each UE of the one or more UEs.

Aspect 23 is the method of aspect 22, wherein the re-establishment information may include a cell radio network temporary identifier (CRNTI) and a shortened message authentication code-integrity (short-MAC-I) for each UE of the one or more UEs.

Aspect 24 is the method of aspect 23, wherein the CRNTI and the short-MAC-I for each UE of the one or more UEs may be the last CRNTI and a last short-MAC-I for each UE before the link failure.

Aspect 25 is the method of any of aspects 17 to 24, where the handover request may be for multiple UEs of the one or more UE.

Aspect 26 is the method of any of aspects 17 to 25, where the method may further include receiving, from the target network entity, a handover request acknowledgement confirming the reception of the handover request.

Aspect 27 is the method of any of aspects 17 to 26, where the method may further include, prior to detecting the link failure: transmitting, for the one or more UEs via system information block (SIB), neighboring information including information of the target network entity.

Aspect 28 is an apparatus for wireless communication at a source network entity, comprising: a processing system that includes processor circuitry and memory circuitry that stores code and is coupled with the processor circuitry, the processing system configured to cause the network entity to perform the method of one or more of aspects 17-27.

Aspect 29 is an apparatus for wireless communication at a source network entity, comprising: one or more memories; and one or more processors coupled to the one or more memories and, based on stored information that is stored in the one or more memories, the one or more processors, individually or in any combination, are configured to cause the source network entity to perform the method of any of aspects 17-27.

Aspect 30 is the apparatus for wireless communication at a source network entity, comprising means for performing each step in the method of any of aspects 17-27.

Aspect 31 is an apparatus of any of aspects 28-30, further comprising a transceiver configured to receive or to transmit in association with the method of any of aspects 17-27.

Aspect 32 is a computer-readable medium (e.g., a non-transitory computer-readable medium) storing computer executable code at a source network entity, the code when executed by at least one processor causes the source network entity to perform the method of any of aspects 17-27.

What is claimed is:

1. An apparatus of wireless communication at a target network entity, comprising:

one or more memories; and one or more processors coupled to the one or more memories and, based at least in part on stored information that is stored in the one or more memories, the one or more processors are configured to cause the target network entity to:

receive, from a source network entity, a handover request to the target network entity for one or more user equipment (UEs), wherein the handover request indicates a link failure with the source network entity as a cause for the handover request, wherein the link failure includes a feeder link failure, and wherein the feeder link failure is identified in an information element of the handover request;

receive, from one UE of the one or more UEs, a re-establishment request; and communicate with the one UE based on a UE context obtained prior to the re-establishment request.

2. The apparatus of claim 1, further comprising a transceiver coupled to the one or more processors, wherein, to receive the handover request, the one or more processors is configured to receive the handover request via the transceiver, and wherein the one or more processors are further configured to cause the target network entity to:

prepare, based on information in the handover request, the UE context for each UE of the one or more UEs prior to reception of the re-establishment request from any of the one or more UEs.

3. The apparatus of claim 2, wherein the source network entity is associated with a non-terrestrial network (NTN).

4. The apparatus of claim 2, wherein the source network entity is associated with a terrestrial network (TN).

5. The apparatus of claim 2, wherein the handover request is a combined handover request and includes re-establishment information for each UE of the one or more UEs.

6. The apparatus of claim 5, wherein the re-establishment information includes a cell radio network temporary identifier (CRNTI) and a shortened message authentication code-integrity (short-MAC-I) for each UE of the one or more UEs.

7. The apparatus of claim 6, wherein the CRNTI and the short-MAC-I for each UE of the one or more UEs are a last CRNTI and a last short-MAC-I before the link failure for each UE.

8. The apparatus of claim 2, wherein the handover request is for multiple UEs of the one or more UEs.

9. The apparatus of claim 2, wherein, prior to being configured to communicate with the one UE, the one or more processors are further configured to cause the target network entity to:

admit, based on the UE context, the one UE; and transmit, for the one UE, a re-establishment response.

10. The apparatus of claim 2, wherein, after being configured to prepare the UE context for each UE of the one or more UEs, the one or more processors are further configured to cause the target network entity to:

transmit, for the source network entity, a handover request acknowledgement that confirms a reception of the handover request.

11. An apparatus of wireless communication at a source network entity, comprising:

one or more memories; and one or more processors coupled to the one or more memories and, based at least in part on stored information that is stored in the one or more memories, the one or more processors are configured to cause the source network entity to:

detect a link failure for one or more user equipment (UEs), wherein the link failure includes a feeder link failure; and provide, to a target network entity, a handover request for the target network entity for each UE of the one or more UEs, wherein the handover request indicates the link failure as a cause for the handover request, wherein the feeder link failure is identified in an information element of the handover request, wherein the handover request causes the target network entity to prepare a UE context for the one or more UEs prior to reception of a re-establishment request from the one or more UEs.

12. The apparatus of claim 11, further comprising a transceiver coupled to the one or more processors, wherein, to provide the handover request, the one or more processors are configured to cause the source network entity to provide the handover request via the transceiver, and wherein the source network entity is associated with a non-terrestrial network (NTN).

13. The apparatus of claim 11, wherein the source network entity is associated with a terrestrial network (TN).

14. The apparatus of claim 11, wherein to provide the handover request for the target network entity, the one or more processors are configured to cause the source network entity to:

provide the handover request for the target network entity independent of a request from the target network entity.

15. The apparatus of claim 11, wherein the handover request is a combined request and includes re-establishment information for each UE of the one or more UEs.

16. The apparatus of claim 15, wherein the re-establishment information includes a cell radio network temporary identifier (CRNTI) and a shortened message authentication code-integrity (short-MAC-I) for each UE of the one or more UEs.

17. The apparatus of claim 16, wherein the CRNTI and the short-MAC-I for each UE of the one or more UEs are a last CRNTI and a last short-MAC-I before the link failure for each UE.

18. The apparatus of claim 11, wherein the handover request is for multiple UEs of the one or more UEs.

19. The apparatus of claim 11, wherein the one or more processors are further configured to cause the source network entity to:

receive, from the target network entity, a handover request acknowledgement that confirms a reception of the handover request.

20. The apparatus of claim 11, wherein, prior to being configured to detect the link failure, the one or more processors are further configured to cause the source network entity to:

transmit, for the one or more UEs via system information block (SIB), neighboring information that includes information of the target network entity.

21. A method of wireless communication at a target network entity, comprising:

receiving, from a source network entity, a handover request to the target network entity for one or more user equipment (UEs), the handover request indicating a link failure with the source network entity as a cause for the handover request, wherein the link failure includes a feeder link failure, and wherein the feeder link failure is identified in an information element of the handover request;

receiving, from one UE of the one or more UEs, a re-establishment request; and communicating with the one UE based on a UE context obtained prior to the re-establishment request.

22. The method of claim 21, further comprising:

preparing, by the target network entity based on information in the handover request, the UE context for each UE of the one or more UEs prior to receiving the re-establishment request from any of the one or more UEs.

23. The method of claim 22, wherein the source network entity is associated with a non-terrestrial network (NTN).

24. The method of claim 22, wherein the handover request is a combined handover request and includes re-establishment information for each UE of the one or more UEs.

25. The method of claim 24, wherein the re-establishment information includes a cell radio network temporary identifier (CRNTI) and a shortened message authentication code-integrity (short-MAC-I) for each UE of the one or more UEs.

26. The method of claim 25, wherein the CRNTI and the short-MAC-I for each UE of the one or more UEs are a last CRNTI and a last short-MAC-I for each UE before the link failure.

27. The method of claim 22, wherein the handover request is for multiple UEs of the one or more UEs.

28. A method of wireless communication at a source network entity, comprising:

detecting a link failure for one or more user equipment (UEs) wherein the link failure includes a feeder link failure; and providing, to a target network entity, a handover request for the target network entity for each UE of the one or more UEs, the handover request indicating the link failure as a cause for the handover request, wherein the feeder link failure is identified in an information element of the handover request, wherein the handover request causes the target network entity to prepare a UE context for the one or more UEs prior to receiving a re-establishment request from the one or more UEs.

29. The method of claim 28, wherein the source network entity is associated with a non-terrestrial network (NTN).

30. The method of claim 28, wherein the source network entity is associated with a terrestrial network (TN).

* * * * *